(12) United States Patent
Socolof et al.

(10) Patent No.: US 11,521,149 B2
(45) Date of Patent: Dec. 6, 2022

(54) GENERATING SENTIMENT METRICS USING EMOJI SELECTIONS

(71) Applicant: YAWYE, Cragsmoor, NY (US)

(72) Inventors: Daniel Socolof, Cragsmoor, NY (US); Gillian Lyndall Christie, Cragsmoor, NY (US)

(73) Assignee: YAWYE, Cragsmoor, NY (US)

( * ) Notice: Subject to any disclaimer, the term of this patent is extended or adjusted under 35 U.S.C. 154(b) by 242 days.

(21) Appl. No.: 16/874,429

(22) Filed: May 14, 2020

(65) Prior Publication Data

US 2021/0097468 A1 Apr. 1, 2021

Related U.S. Application Data

(60) Provisional application No. 62/847,680, filed on May 14, 2019.

(51) Int. Cl.
*G06F 16/00* (2019.01)
*G06Q 10/06* (2012.01)
(Continued)

(52) U.S. Cl.
CPC ..... *G06Q 10/06393* (2013.01); *G06F 16/287* (2019.01); *G06F 16/3347* (2019.01);
(Continued)

(58) Field of Classification Search
CPC .. G06F 16/5838; G06F 16/287; G06F 16/248; G06F 40/242; G06F 40/30;
(Continued)

(56) References Cited

U.S. PATENT DOCUMENTS 9,836,741 B2 * 12/2017 Varadarajan ....... G06Q 20/3829
10,311,144 B2 * 6/2019 Bellegarda .............. G06F 40/30
(Continued)

FOREIGN PATENT DOCUMENTS

WO WO2013148850 A1 * 10/2013
WO WO2015050910 A1 * 4/2015
(Continued)

OTHER PUBLICATIONS

Sara R. Jaeger et al., "Dominant meanings of facial emoji: Insights from Chinese consumers and comparison with meanings from internet resources", Food Quality and Preference 62 (2017) pp. 275-283.*

(Continued)

*Primary Examiner* — Srirama Channavajjala
(74) *Attorney, Agent, or Firm* — Perkins Coie LLP

(57) ABSTRACT

Methods, devices and systems for measuring emotions expressed by computing emoji responses to videos are described. An example method includes receiving user input corresponding to an emoji at a selected time, assigning at least one meaning-bearing word to the emoji, wherein the at least one meaning-bearing word has an intended use or meaning that is represented by the emoji, associating a corresponding vector with the at least one meaning-bearing word, wherein the corresponding vector is a vector of a plurality of vectors in a vector space, and aggregating the plurality of vectors to generate an emoji vector that corresponds to the user sentiment.

28 Claims, 26 Drawing Sheets

(51) Int. Cl.
*G06F 40/30* (2020.01)
*G06F 40/242* (2020.01)
*G06F 16/583* (2019.01)
*G06F 17/00* (2019.01)
*G06F 16/68* (2019.01)
*G06F 16/74* (2019.01)
*G06F 16/901* (2019.01)
*G06F 16/33* (2019.01)
*G06F 16/28* (2019.01)

(52) U.S. Cl.
CPC ...... *G06F 16/5838* (2019.01); *G06F 16/5846* (2019.01); *G06F 16/686* (2019.01); *G06F 16/743* (2019.01); *G06F 16/9017* (2019.01); *G06F 17/00* (2013.01); *G06F 40/242* (2020.01); *G06F 40/30* (2020.01)

(58) Field of Classification Search
CPC .. G06F 40/211; G06F 16/9017; G06F 16/743; G06F 16/686; G06F 16/3347; G06F 16/5846; G06N 3/0454; G06Q 20/3829; G06Q 20/425
See application file for complete search history.

(56) References Cited

U.S. PATENT DOCUMENTS

| | | | |
|---|---|---|---|
| 10,558,757 B2* | 2/2020 | Fan | G06F 40/30 |
| 11,030,238 B2* | 6/2021 | Dimson | G06F 16/5838 |
| 11,093,854 B2* | 8/2021 | Gao | G06F 3/0237 |
| 11,200,243 B2* | 12/2021 | Venkataraman | G06F 16/248 |
| 11,405,380 B2* | 8/2022 | Dorfman | G06Q 20/425 |
| 2013/0247078 A1 | 9/2013 | Nikankin et al. | |
| 2014/0067397 A1 | 3/2014 | Radebaugh | |
| 2015/0100537 A1 | 4/2015 | Grieves et al. | |
| 2017/0052946 A1* | 2/2017 | Gu | H04L 51/046 |
| 2017/0185581 A1 | 6/2017 | Bojja et al. | |
| 2017/0344224 A1* | 11/2017 | Kay | G06F 3/0482 |
| 2018/0098119 A1* | 4/2018 | Overcash | H04N 21/44226 |
| 2018/0295072 A1* | 10/2018 | Yim | H04L 51/10 |
| 2019/0073411 A1* | 3/2019 | Booker | G06F 16/287 |
| 2019/0087466 A1* | 3/2019 | Wang | G06F 9/451 |
| 2019/0115034 A1* | 4/2019 | Frett | H04N 21/4302 |
| 2019/0122403 A1* | 4/2019 | Woo | G06N 3/0454 |
| 2019/0294678 A1* | 9/2019 | Sapugay | G06F 40/211 |
| 2020/0104316 A1* | 4/2020 | Dimson | G06F 16/5838 |

FOREIGN PATENT DOCUMENTS

| | | | |
|---|---|---|---|
| WO | WO2017116839 | A1 * | 7/2017 |
| WO | WO2018053594 | A1 * | 3/2018 |
| WO | WO2019027772 | A1 * | 2/2019 |

OTHER PUBLICATIONS

Projit Chandra et al., "Classification of Emojis using Artificial Neural Network and Natural Language Processing", 2021 8th International Conference on Computing for Sustainable Global Development (INDIACom).*

Travis LeCompte et al., "Sentiment Analysis of Tweets Including Emoji Data", International Conference on Computational Science and Computational Intelligence, 2017, pp. 793-798.*

International Search Report and Written Opinion of International Application No. PCT/US2020/032947; dated Jul. 30, 2020; 11 pages.

* cited by examiner

*FIG. 4B*

Overlay Name: CCv1
Video: Student Debt v2
Emoji: 1 Heart
2 Thumbs up
3 Afraid
Rolling eyes

| Name | Question | Choice buttons | Seconds in story |
|---|---|---|---|
| SD Q1 | Do you know anyone who has student debt? | Y/N | 30 to 60 |
| SD Q4 | Do you have aside hustle | Y/N/Used to but not now | 450 to 550 |

| Name | Question | | Seconds in story |
|---|---|---|---|
| Yawye T&T 1 | Did you know you will ALWAYS be anonymous | | 30 to 60 |
| Yawye T&T 2 | Do you know you can press any emoji at any time to express your feeling about the story | | 70 to 100 |

*FIG. 4D*

GENERATING SENTIMENT METRICS USING EMOJI SELECTIONS

CROSS-REFERENCE TO RELATED APPLICATION

This patent document claims priority to and benefit of U.S. Provisional Patent Application No. 62/847,680 entitled "GENERATING SENTIMENT METRICS USING EMOJI SELECTIONS, ALONG WITH SYSTEMS AND METHODS FOR ACCOMPLISHING SAME" and filed on May 14, 2019. The entire content of the before-mentioned patent application is incorporated by reference as part of the disclosure of this patent document.

TECHNICAL FIELD

This patent document is directed generally to feedback systems, and more particularly, a technological solution for sentiment feedback using emojis.

BACKGROUND

Measuring people's emotions and their emotional association with their work and careers is a complex and vibrant area of research. Different methodologies, including surveys, questionnaires and pop-up questions, have been traditionally used by human resources to ascertain an employee's sentiments and to address workplace issues. These traditional methodologies suffer from several drawbacks that include failing to capture the sentiment of the employee, a lack of anonymity, and reduced efficacy due to the limited number of questions typically used.

SUMMARY

The systems and methods disclosed herein can be used to measure emotions expressed by computing emoji responses to videos, which can then be used in varied applications, such as by corporations, businesses, universities, etc. In an example, the systems and methods disclosed herein can be used by corporations to address pervasive workplace issues such as high turnover, resulting from employee mistrust and employer misunderstanding, with innovative and intuitive sentiment assessment. In another example, embodiments of the disclosed technology can be used in consumer focused strategic campaigns and/or political campaigns to gauge public sentiment regarding products or services and candidates and elected officials, respectively.

In an example aspect, a method for generating sentiment metrics using emoji selections is disclosed. The method includes receiving user input corresponding to an emoji at a selected time, assigning at least one meaning-bearing word to the emoji, wherein the at least one meaning-bearing word has an intended use or meaning that is represented by the emoji, associating a corresponding vector with the at least one meaning-bearing word, wherein the corresponding vector is a vector of a plurality of vectors in a vector space, and aggregating the plurality of vectors to generate an emoji vector that corresponds to the user sentiment.

In another example aspect, a method for generating sentiment metrics using emoji selections is disclosed. The method includes receiving user input, from each of the plurality of users, the user input corresponding to a plurality of emojis associated with a plurality of timestamps in the video, aggregating, for each of the plurality of timestamps, the corresponding plurality of emojis from each of the plurality of users to generate an aggregated sequence of emojis, performing a clustering operation on the aggregated sequence of emojis to identify a plurality of clusters, wherein each cluster represents an aggregated user sentiment for the corresponding timestamp or between two timestamps of the plurality of timestamps, generating, for each of the plurality of clusters, a macro emoji vector, and generating, based on comparing the macro emoji vector to a set of emotional vectors, the overlay comprising an emotion for the corresponding timestamp or between the two timestamps.

In yet another example aspect, the above-described method is embodied in the form of processor-executable code and stored in a computer-readable program medium.

In yet another example aspect, a device that is configured or operable to perform the above-described method is disclosed. The device may include a processor that is programmed to implement this method.

BRIEF DESCRIPTION OF THE DRAWINGS

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

FIGS. 4A-4D illustrate example data structures to store information about videos and overlays.

DETAILED DESCRIPTION

Figure 1A:
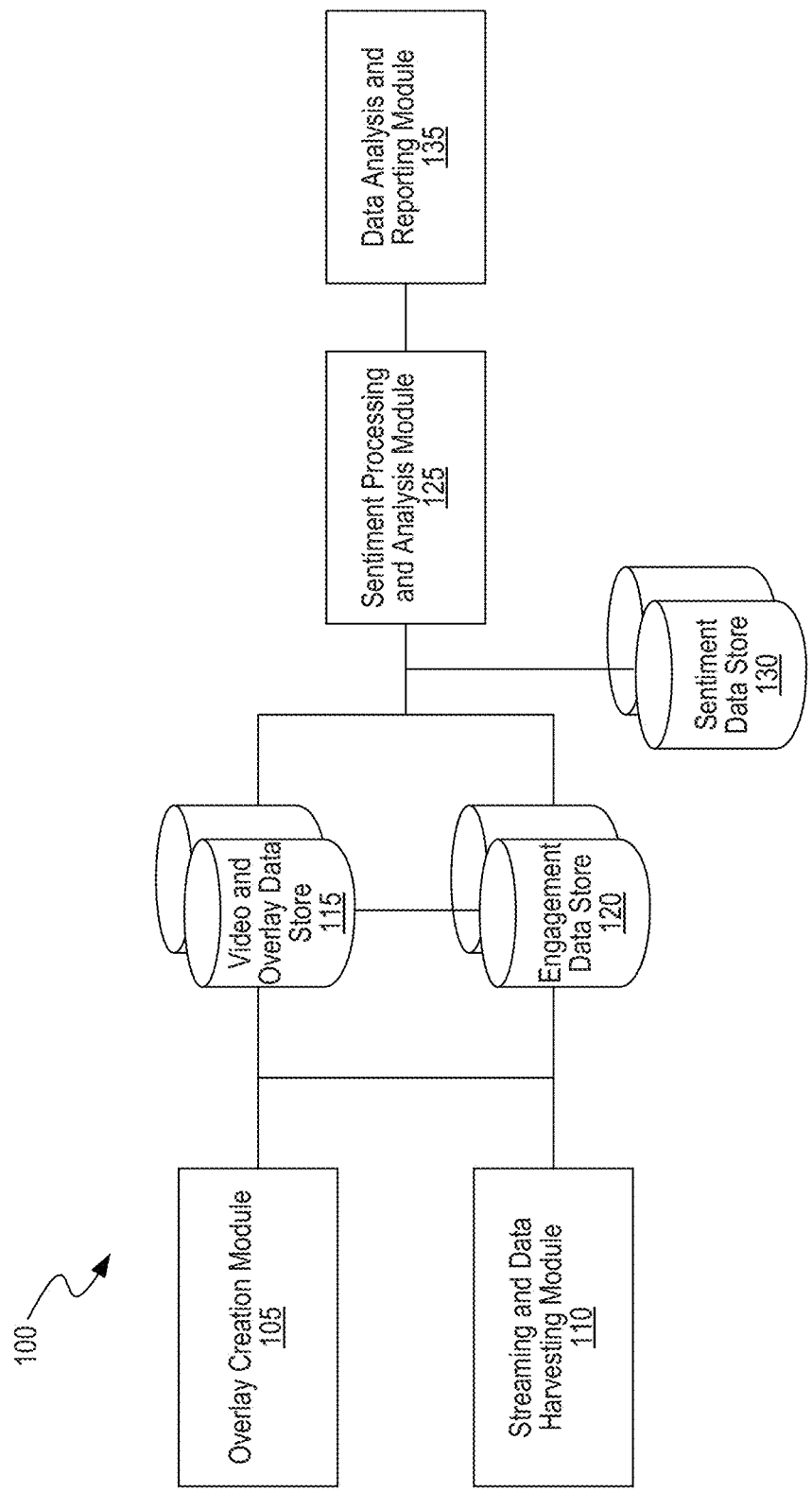
FIG. 1A-1B are block diagrams showing some of the components of a sentiment analysis system and how they interact.

In the example of a possible business application, corporate business organizations are experiencing significant challenges trying to effectively communicate and relate to next generation workers. This is a critical problem because millennials will grow to over 70% of the workforce in 2025. Today, with four generations of Americans in the workplace, leadership is increasingly frustrated trying to understand the emotional state of its growing young workforce. With thousands to hundreds of thousands of employees, the effects of misunderstanding from the top down are painful and translate into recruitment and retraining costs of $80 billion dollars annually and growing. Young workers are bouncing from good paying jobs, where they've been trained at very high cost. Conventional HR tools, surveys, are not effective because next gen workers are not comfortable responding to questions. Their communication tool sets, driven by the transformation in social media have evidenced profound communication implications. Misunderstanding from the top down and mistrust, among next gen workers, are driving and accelerating the problem of organizational loyalty.

Conventional HR tools, surveys, are not effective. Next Gen workers are not comfortable responding to questions; or communicating in that manner. For example, when Twitter restricted "tweets" to 140 characters and Emoji replaced words for billions of electronic expressions every single day, tools, like surveys, which worked in the past, are no longer able to get at the true authentic pulse, the emotional nuance of the modern workforce. And surveys experience low response rates because they are often long and tedious to complete, though recent innovations with "pulse" surveys—one or two questions, delivered frequently—are being deployed. Most surveys are multiple choice questionnaires, and this introduces pitfalls to sentiment harvesting. The question can be ambiguous, complex and assume prior understanding. The answer options are usually a rudimentary binary (positive to negative) result or inadequate for certain individuals, where none of the options apply to the question.

Further, in corporate America the surveys often gather information about the business unit (department or team), the gender, the race, the age. They also solicit comments. This combination of demographics and individual comments can identify an individual, especially in a non-diverse corporate environment.

Digital natives, next gen (millennials and gen z) is about to become the biggest workforce demographic. To solicit their sentiment, existing systems must adapt to provide them channels that they wish to engage in. The disclosed technology deploys video and emoji—two activities that the next generations are driving—to increase engagement and participation in harvesting sentiment.

Anonymity is a core element of the disclosed technology. A user's email address has associated demographic data at logon. As soon as the user is authenticated, the email address can be replaced with a system generated Watch ID and traceability to the email can be irrevocably severed. The Watch ID retains the demographic data. The identifying data is gender, age range (not age) and US State of the individual derived from the geolocator. This population of identifying data is large enough to prevent any single watcher from being identified.

The disclosed technology offers a choice of emoji captured in context to points in a story. Watchers can express multiple emoji simultaneously to express an emotional response when a single emoji is deemed inadequate by the viewer. At the end of the video story users may be given the opportunity to answer multiple choice questions for the purpose of data triangulation. In an example, their emoji responses can be compared with their intention to leave the company.

In particular, the systems provide platform-agnostic applications for viewing original videos and eliciting user sentiment with emoji feedback. A user can interact with a video by providing selections of one or more emojis while watching the video. The system monitors this user interaction and collects as input, emoji selections by multiple users. The system then aggregates and categorizes this input (e.g., using statistical methods) from multiple users to form sentiment clusters. The sentiment clusters signify spikes in volume per emoji (or collection of emojis). The sentiment clusters may then be used to perform multidimensional analysis and generate sentiment metrics that can be used by organizations to take tangible actions (e.g., modify HR policies).

In the following description, for the purposes of explanation, numerous specific details are set forth in order to provide a thorough understanding of implementations of the present technology. It will be apparent, however, to one skilled in the art that embodiments and implementations of the present technology can be practiced without some of these specific details.

FIG. 1A is a block diagram showing some of the components of a sentiment analysis system 100, according to various implementations. The sentiment analysis system 100 comprises one or more of the following: an overlay creation module 105, a streaming and data harvesting module 110, a sentiment processing and analysis module 125, a data analysis and reporting module 135, videos and overlay data store 115, engagement data store 120, and sentiment analysis data store 130. The videos and overlay data store 115 stores information about the various videos (identifier, name, version, etc.), emoji sets, questions, tips and tricks, Uniform Resource Locator (URL), overlays, and so on. Overlays collectively represent unique combination of emoji's in a certain order, the questions, the tips and tricks, and the associated URL(s) sent to the target users (for example, a company's employees), and so on. The same overlay can be used for multiple applications (for example, organizations, businesses, universities, and so on) with different URLs. FIGS. 4A-4D illustrate example data structures maintained at the videos and overlay data store 115 to store information about videos and overlays according to various implementations. The engagement data store 120 stores information about users' engagement with videos and overlays: user identifier, video identifier, URL identifier, timestamp, emoji, answer, and so on. For example, the engagement data store 120 stores information about time and number of emojis clicked by users when watching a video available at a URL.

Figure 1B:
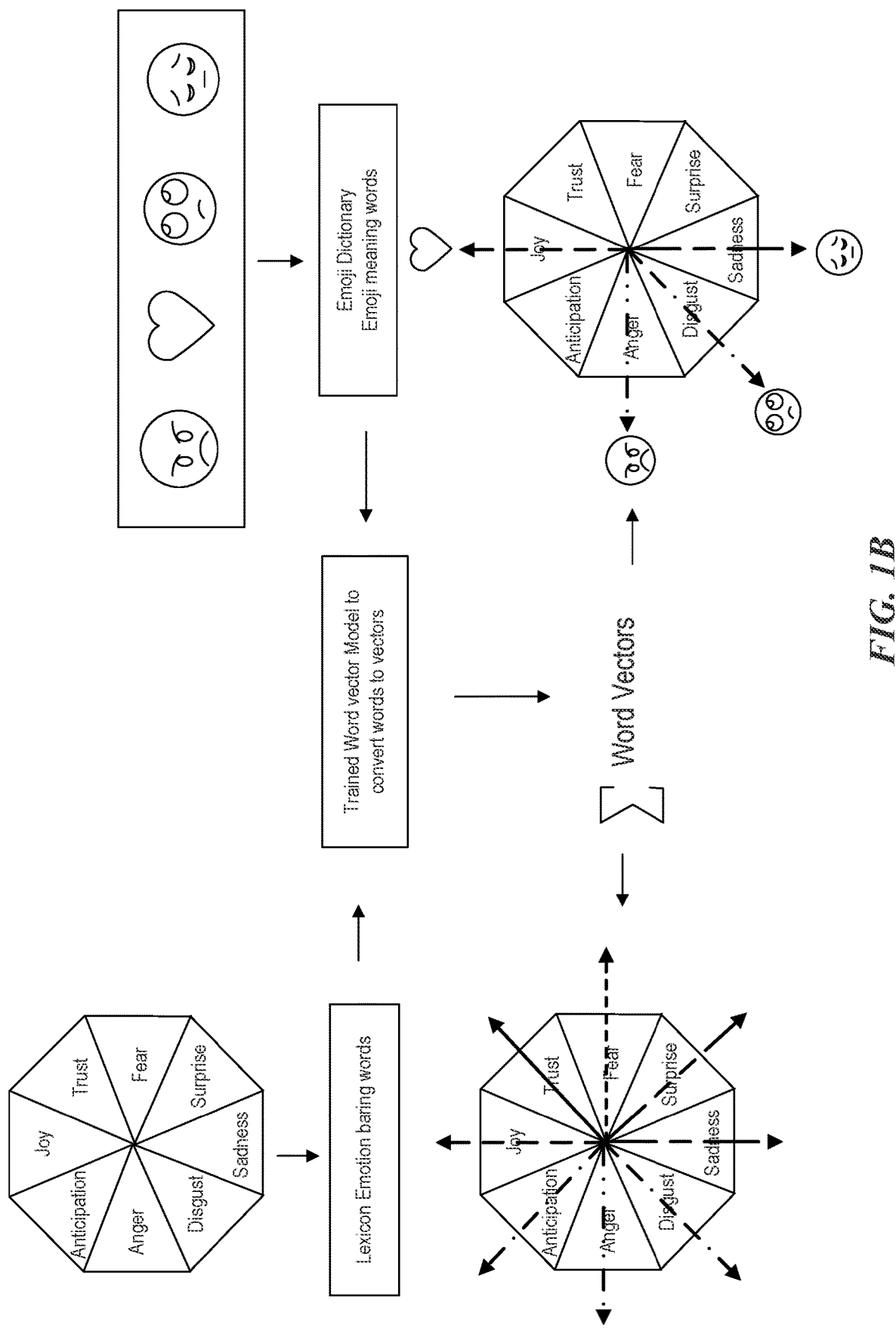

High level process (FIG. 1A)
1. Provide a specific emoji in a specific order applied to one or more specific video stories that offer users the ability to express a spectrum of emotions, moment by moment, while viewing each story.
2. Stream a desired number of stories to user groups and harvest their reactions.
3. Aggregate responses by time sequence across all users.
4. Perform statistical analysis on the video time sequence to find clusters.
5. Derive the individual emoji vectors from the Semantic Training Model (FIG. 1B).
6. Aggregate the individual emoji vectors within the cluster (add them up).
7. Compute the vector sum of all the emoji vectors to generate a macro emoji vector.
8. Compare the macro emoji vector to the emotional vectors obtained in the Sematic Training Model (FIG. 1B).
9. Discern the emotion by finding the emotional vector with the closest cosine value to our macro emoji vector.

Figure 2:
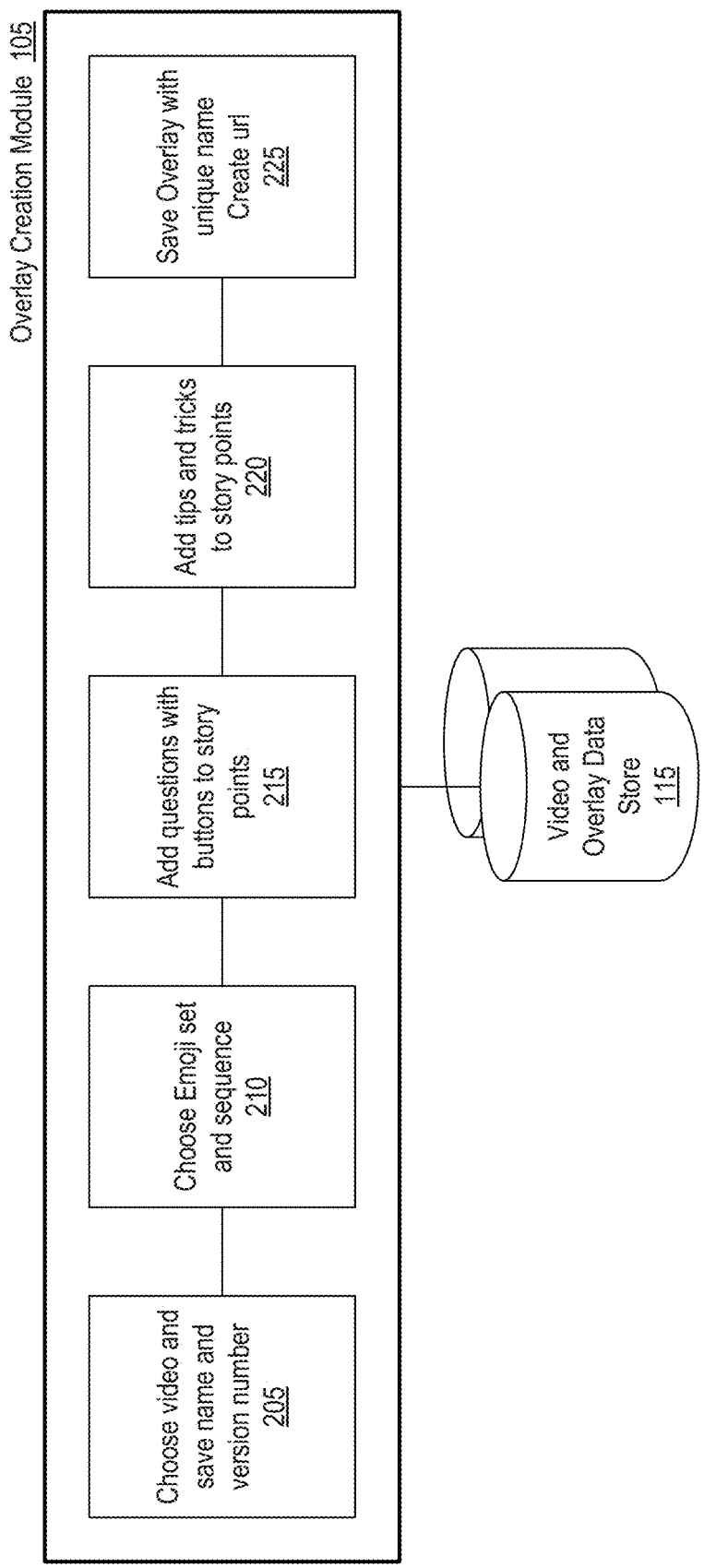
FIG. 2 is a block diagram showing some of the components of an overlay creation module of the sentiment analysis system.

FIG. 2 is a block diagram showing some of the components of an overlay creation module 105 of the sentiment analysis system, according to various implementations. The overlay creation module 105 comprises modules to perform the following acts: choose and save video 205, choose emoji set and sequence 210, add questions with buttons to points in story illustrated in the video 215, add tips and tricks to story points 220, save overlay with unique name and create URL 225, and so on. For example, a user (administrator, designer, etc.) can select a video (e.g., a student debt video) as well as a set of emojis, questions, and tips to be displayed in an overlay at various points during playing of the video. The sets of emojis, questions, and/or tips can change depending on the story point. The sets of emojis, questions, and/or tips can be pre-selected based on the video's content, intended audience, corporation policies, privacy policies, and so on. In some embodiments, the sets of emojis, questions, and/or tips can be determined using a trained machine learning model, such as a forest of decision trees, neural networks, and so on. The overlay creation module 105 stores the information about the videos, overlays, emojis, questions, tips, policies, etc. in the video and overlay data store 115.

Figure 3:
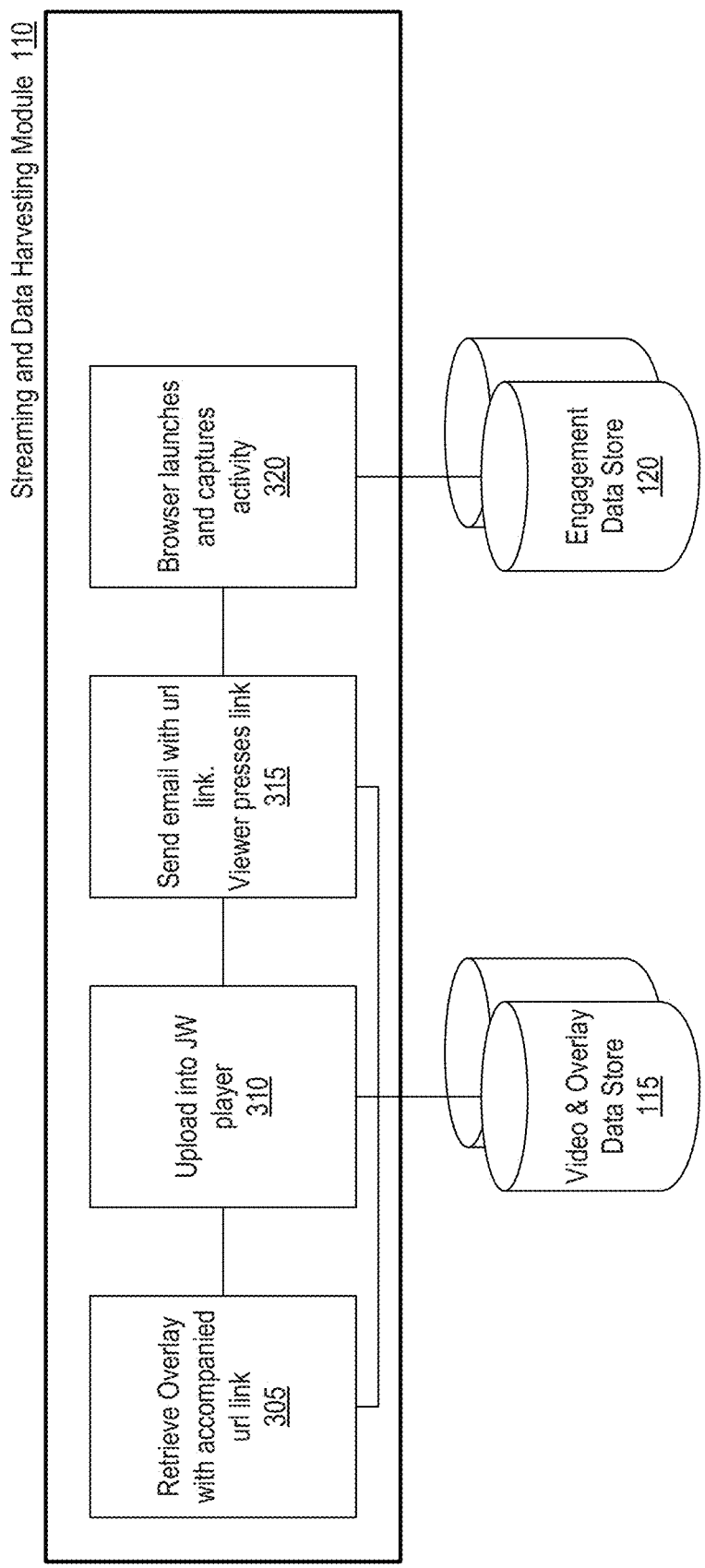
FIG. 3 is a block diagram showing some of the components of a streaming and data harvesting module of the sentiment analysis system.
Figure 4A:
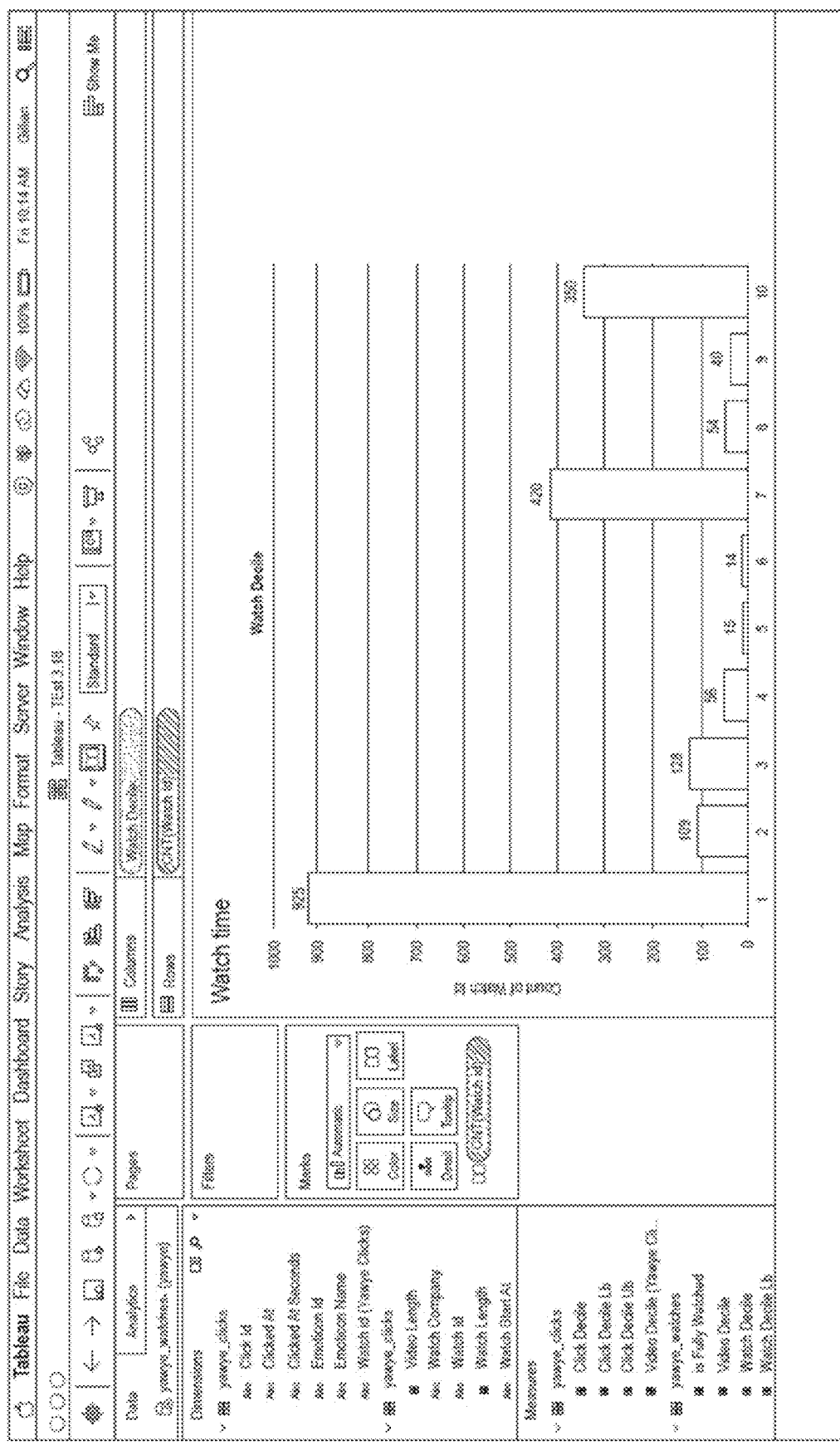
Figure 4B:
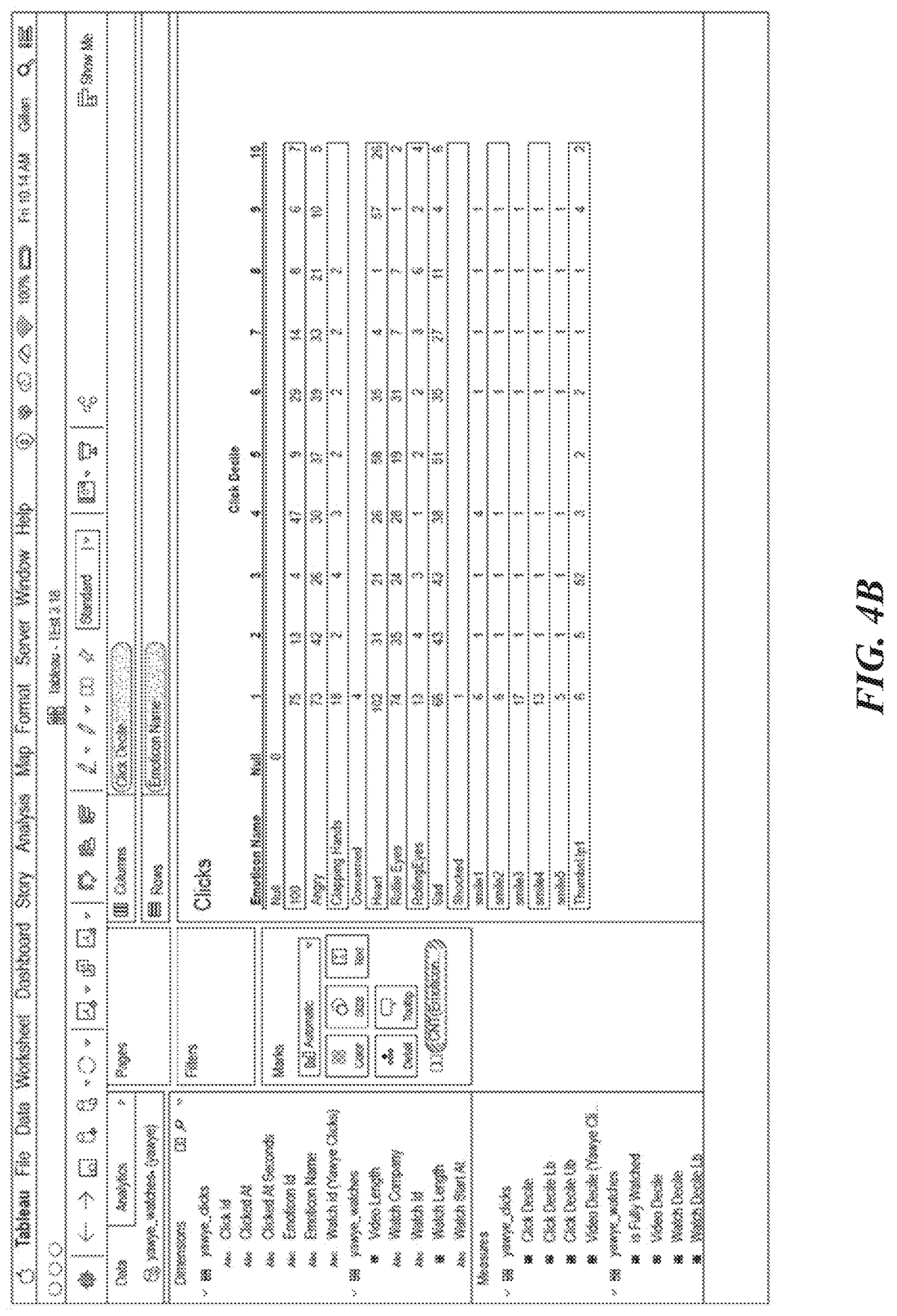
Figure 4C:
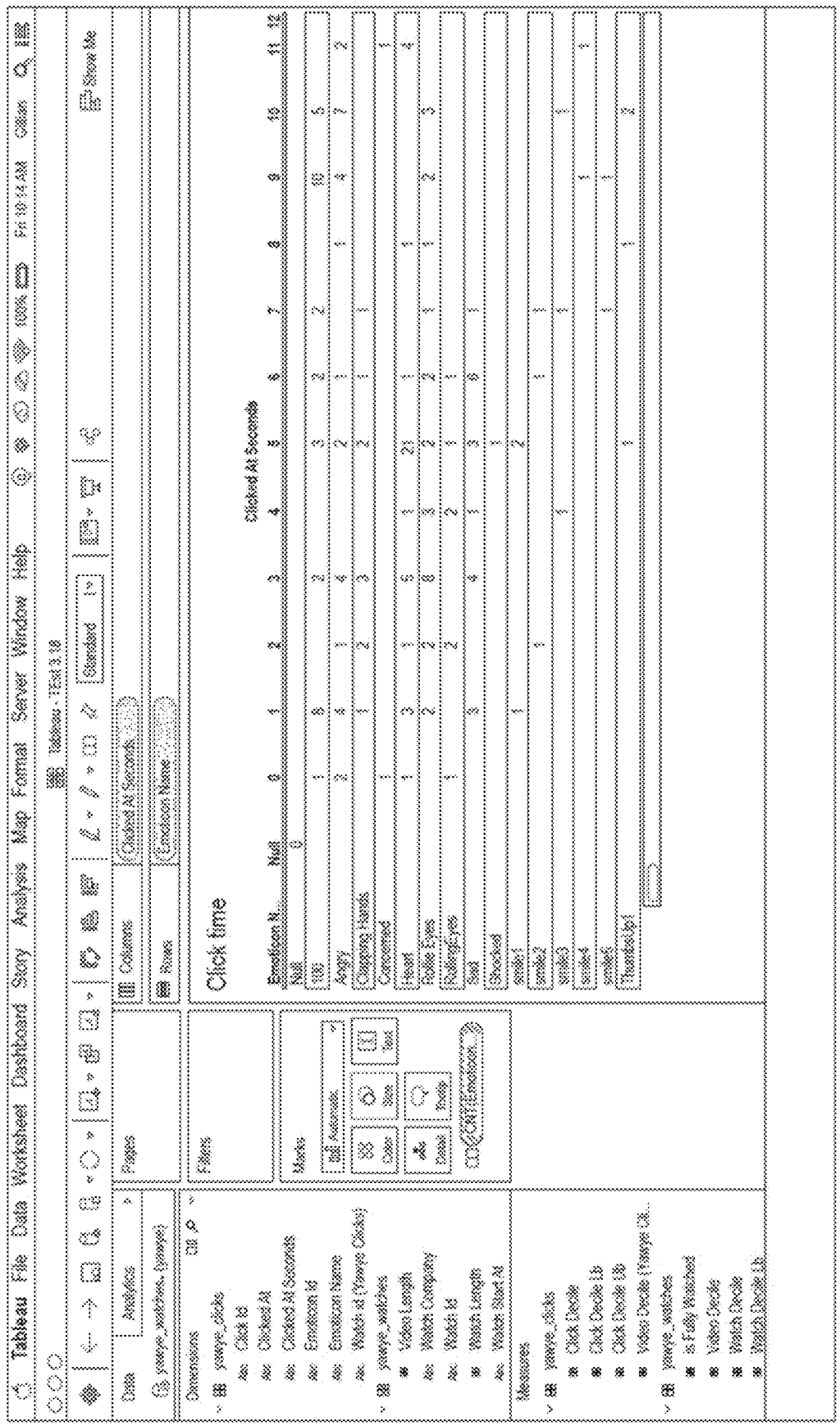
Figure 4E:
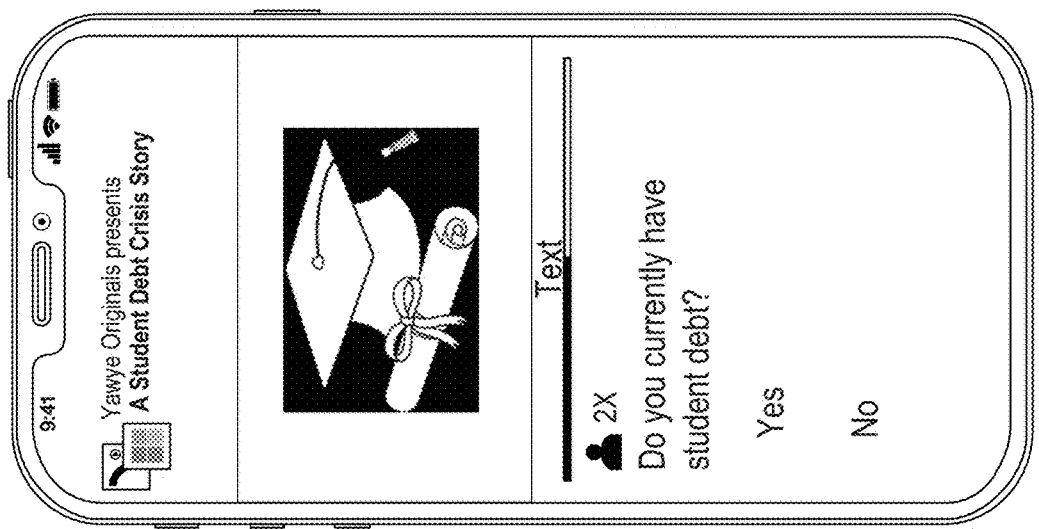
FIGS. 4E-4I are display diagrams illustrating examples of videos and interactive overlays displayed at a mobile device.
Figure 4F:
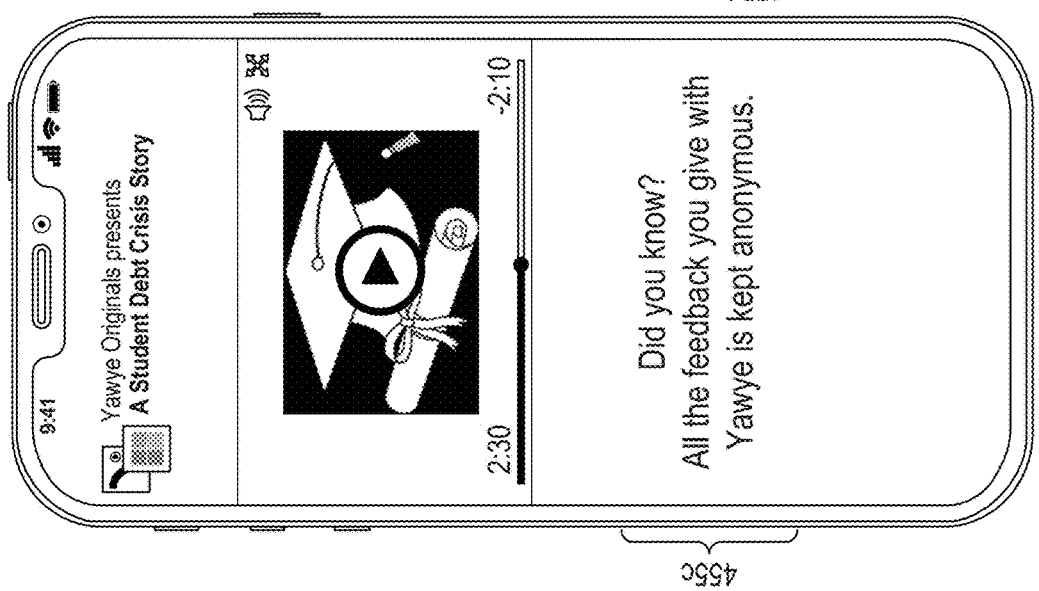
Figure 4G:
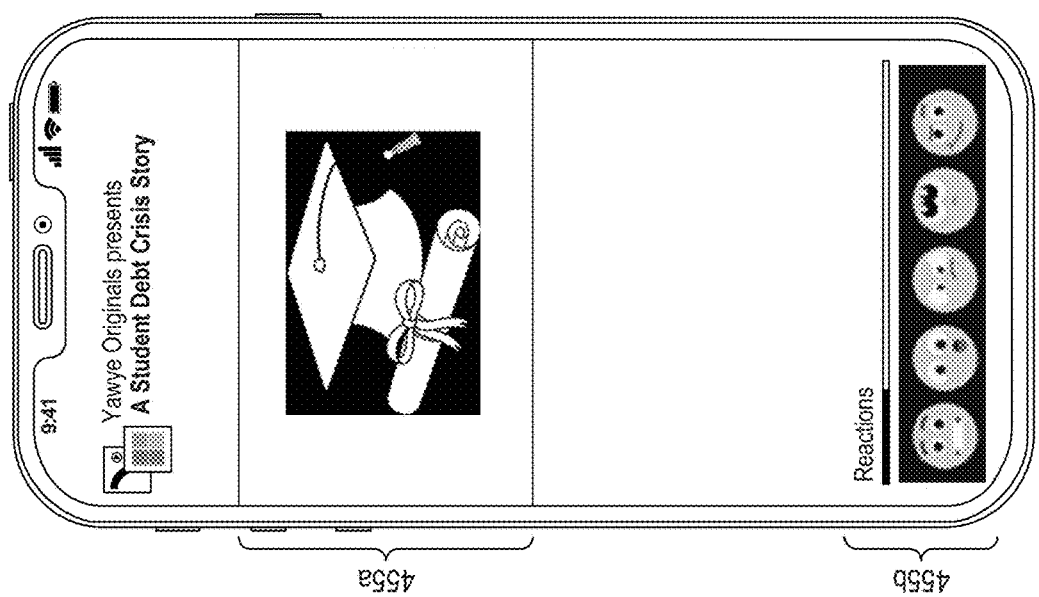
Figure 4H:
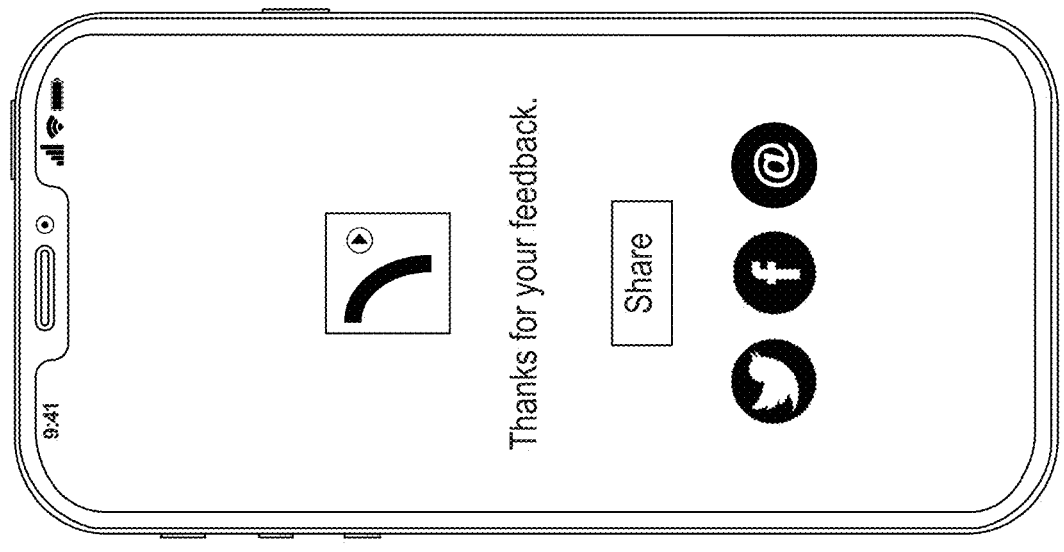
Figure 4I:
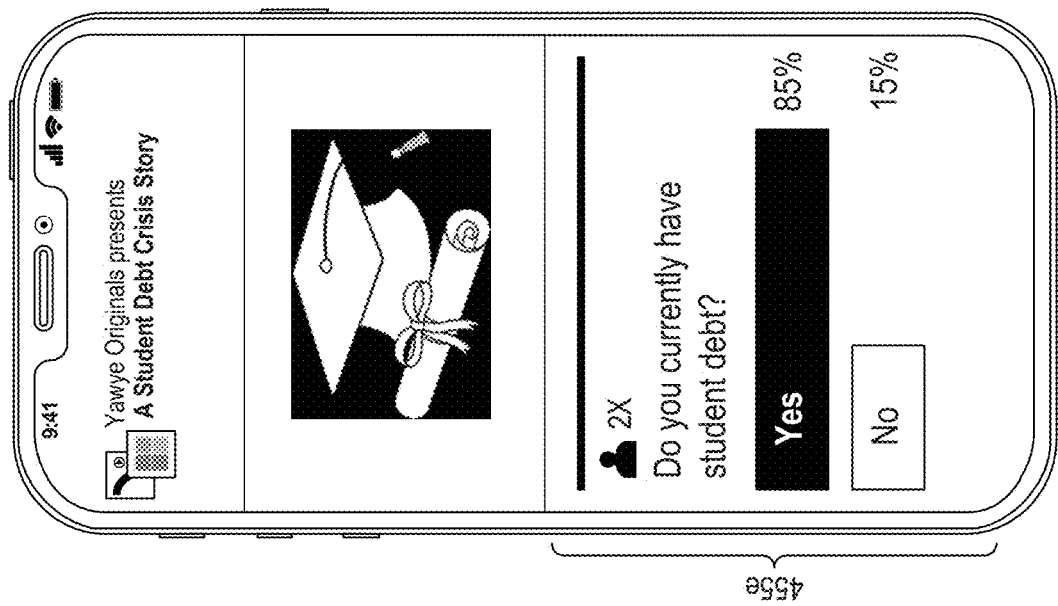

FIG. 3 is a block diagram showing some of the components of a streaming and data harvesting module 110 of the sentiment analysis system, according to various implementations. The streaming and data harvesting module 110 accesses information stored in the video and overlay data store 115, and comprises modules to perform the following acts: retrieve video and associated overlay and URL 305, upload retrieved information to video player (for example, JW Player) 310, transmit URL to users 315 (for example, send email/text with URL to users), enable user to view video and associated overlays, capture user engagement activity 320, and so on. For example, the streaming and data harvesting module 110 uses web services (e.g., Amazon Web Services AWS) to provide users with URLs so that the users can anonymously view content through JW Player. FIGS. 4E-4I are display diagrams illustrating examples of videos and interactive overlays displayed at a mobile device. The streaming and data harvesting module 110 can display a video 455a, overlay with emojis 455b, overlay with questions 455c and 455d, overlay with results 455e, etc. at various story points when the video is playing.

The streaming and data harvesting module 110 stores the captured user engagement activity information in the engagement data store 120. For example, the streaming and data harvesting module 110 captures sentiment and engagement activity and at the end of a viewing session, saves it to MongoDB on Google Cloud.

Figure 5A:
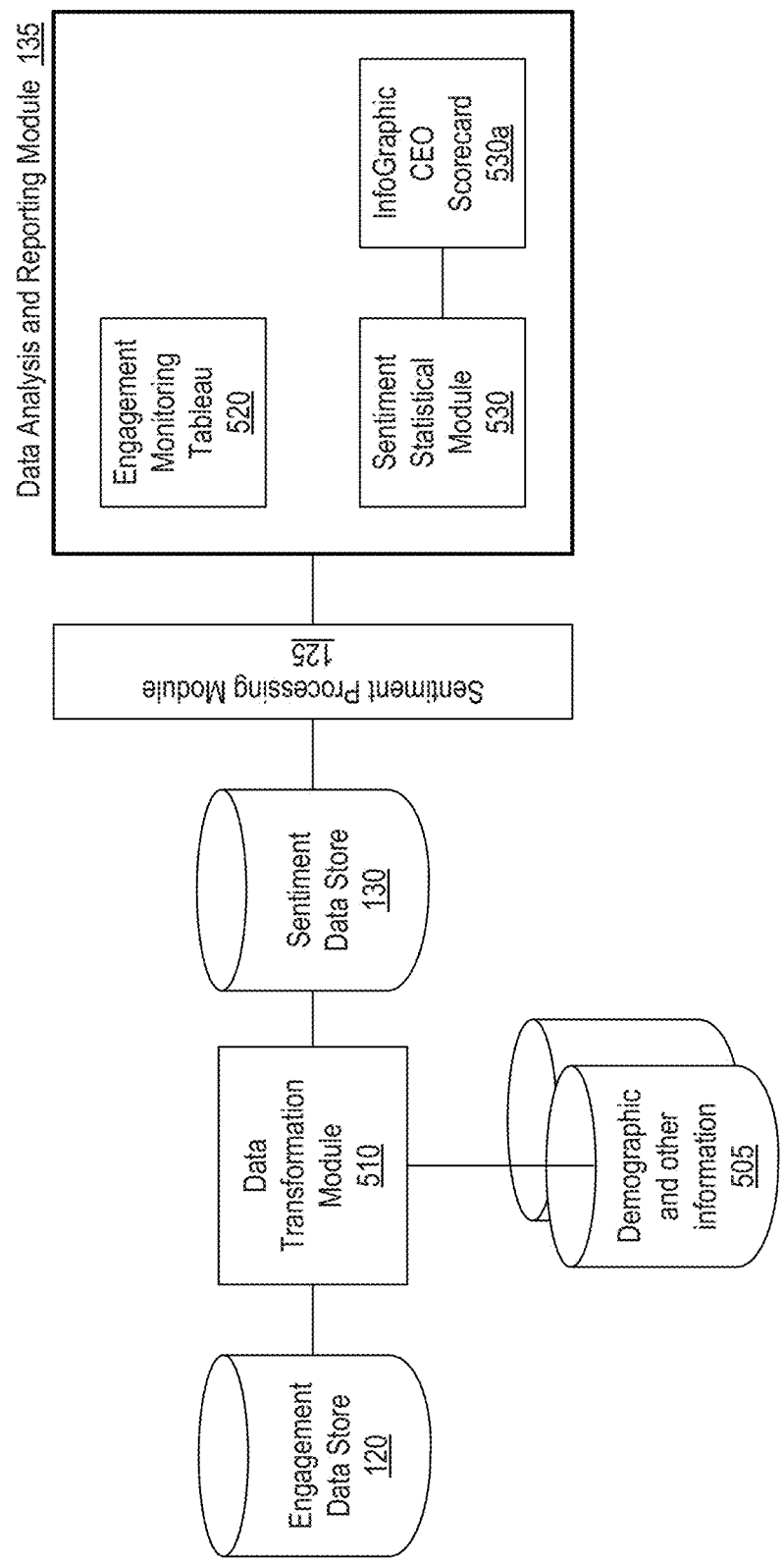
FIG. 5A is a block diagram showing some of the components of a data analysis and reporting module of the sentiment analysis system.

FIG. 5A is a block diagram showing some of the components of a data analysis and reporting module of the sentiment analysis system. In some implementations, a data transformation module 510 can transform the information stored in the engagement data store 120 to a relational database format and store it in the sentiment data store 130. The sentiment processing and analysis module 125 merges the information in the engagement data store 120 and/or the sentiment data store 130 with other information stored in the other data stores, such as demographic data store 505 (storing demographic information, such as gender, location, age, etc.), emoji data store (storing emoji lexicon), and so on to generate sentiment information that is stored in the sentiment data store 130. For example, the sentiment processing and analysis module 125 collects and merges the following types data: data captured by application that tracks user engagement (for example, for each timestamp, each user's emoji reaction(s), pop-up question responses, as well as engagement data (i.e., how long they watched the video), demographic information (sex, age, location, etc.), manually scored/annotated video time course (for example, "truth-set" providing expected valence and sentiment at each moment of the video, as well as identifying sentiment events (i.e., moments that are predicted to elicit user reactions and emoji input)), and so on. Pre-coding the video to perform to identify the story point in the video where the engagement spike was recorded to provide context for the derived emotion from the macro Emoji vector. In several embodiments, the system can "sniff" device to inform the user's familiarity with the divergent emoji renditions. The system can also ask questions at the end of the video the answers to which will help determine sentiment. For example: "Are you affected by Student Debt?" or "Do you have a side hustle?"

Figure 5B:
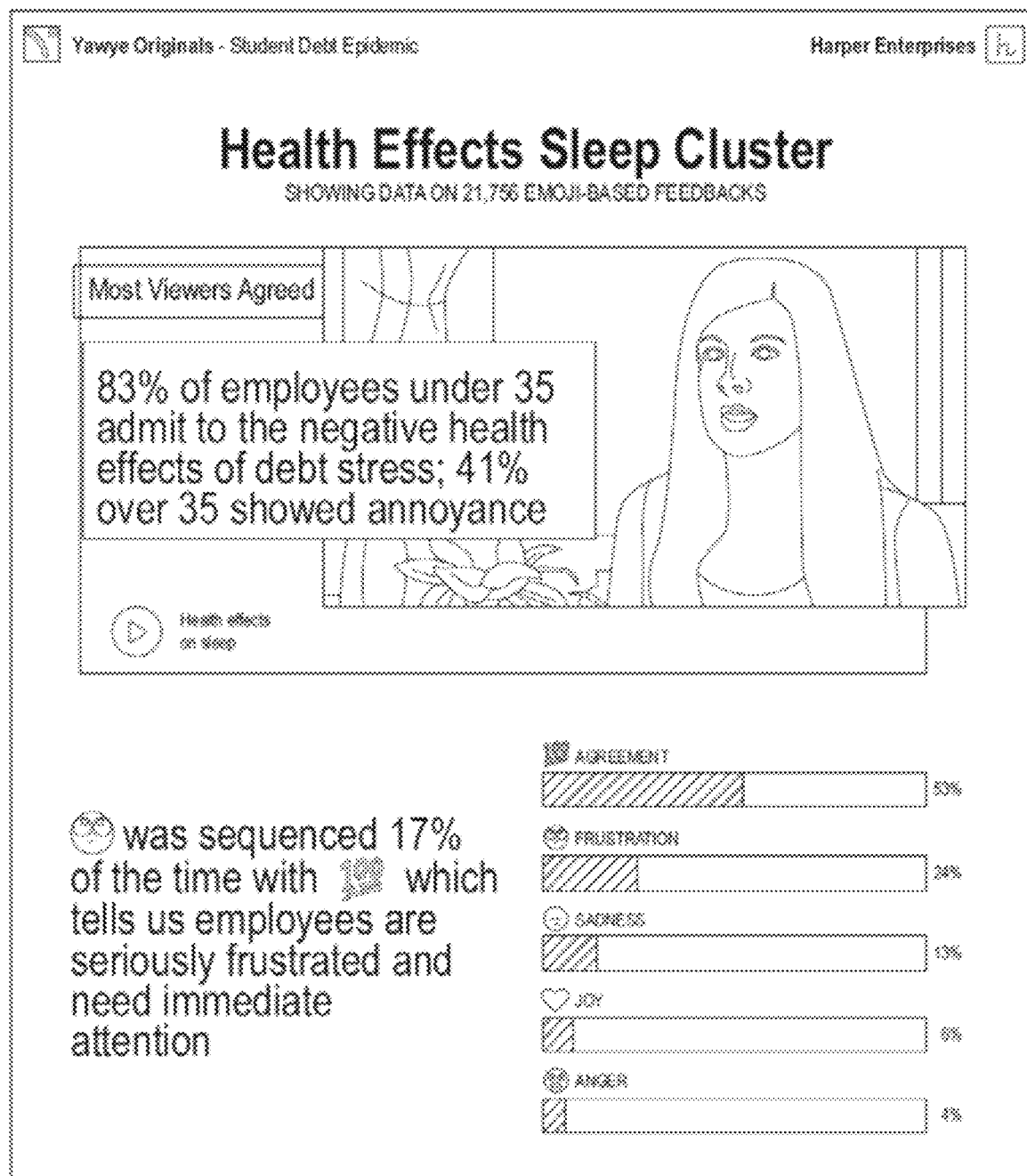
FIG. 5B is a display diagram illustrating an example of a scorecard report.
Figure 5C:
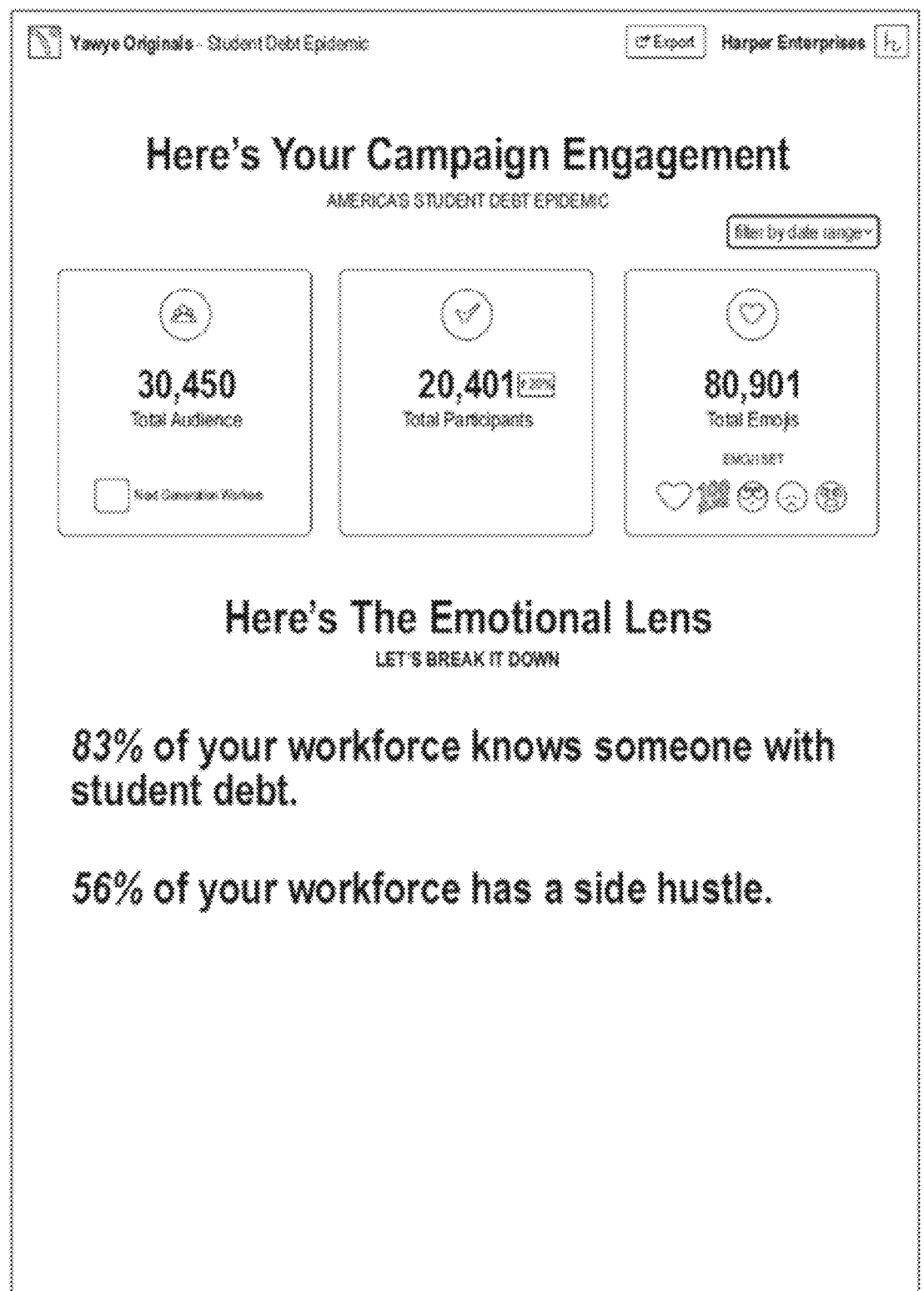
FIG. 5C is a display diagram illustrating an example of an engagement report.

The data analysis and reporting module 135 provides mechanisms for analyzing and/or reporting on the data generated by the sentiment processing and analysis module 125. For example, the data analysis and reporting module 135 generates engagement reports (for example, using Engagement Monitoring Tableau 520), InfoGraphic (for example, CEO Scorecard) 530a (generated through sentiment statistical module 530), and so on. FIG. 5B is a display diagram illustrating an example of a scorecard report 530a, according to various implementations. FIG. 5C is a display diagram illustrating an example of an engagement report according to various implementations.

The sentiment processing and analysis module 125 statistically identifies clusters of responses at a point in the video story and derives the intended sentiment of the aggregated user engagement. The statistical model first identifies the "spikes" in emoji activity at the story point using cluster analysis.

Figure 6A:
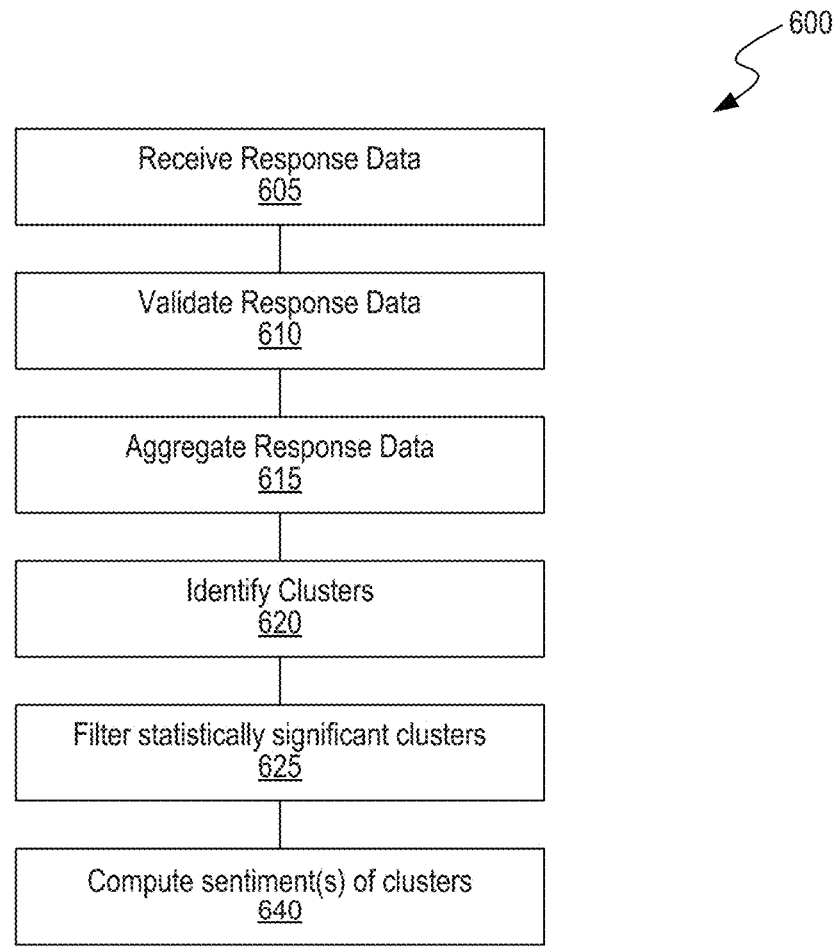
FIGS. 6A and 6B are flow diagrams illustrating example processes of analyzing response data to generate sentiment analysis data.
Figure 6B:
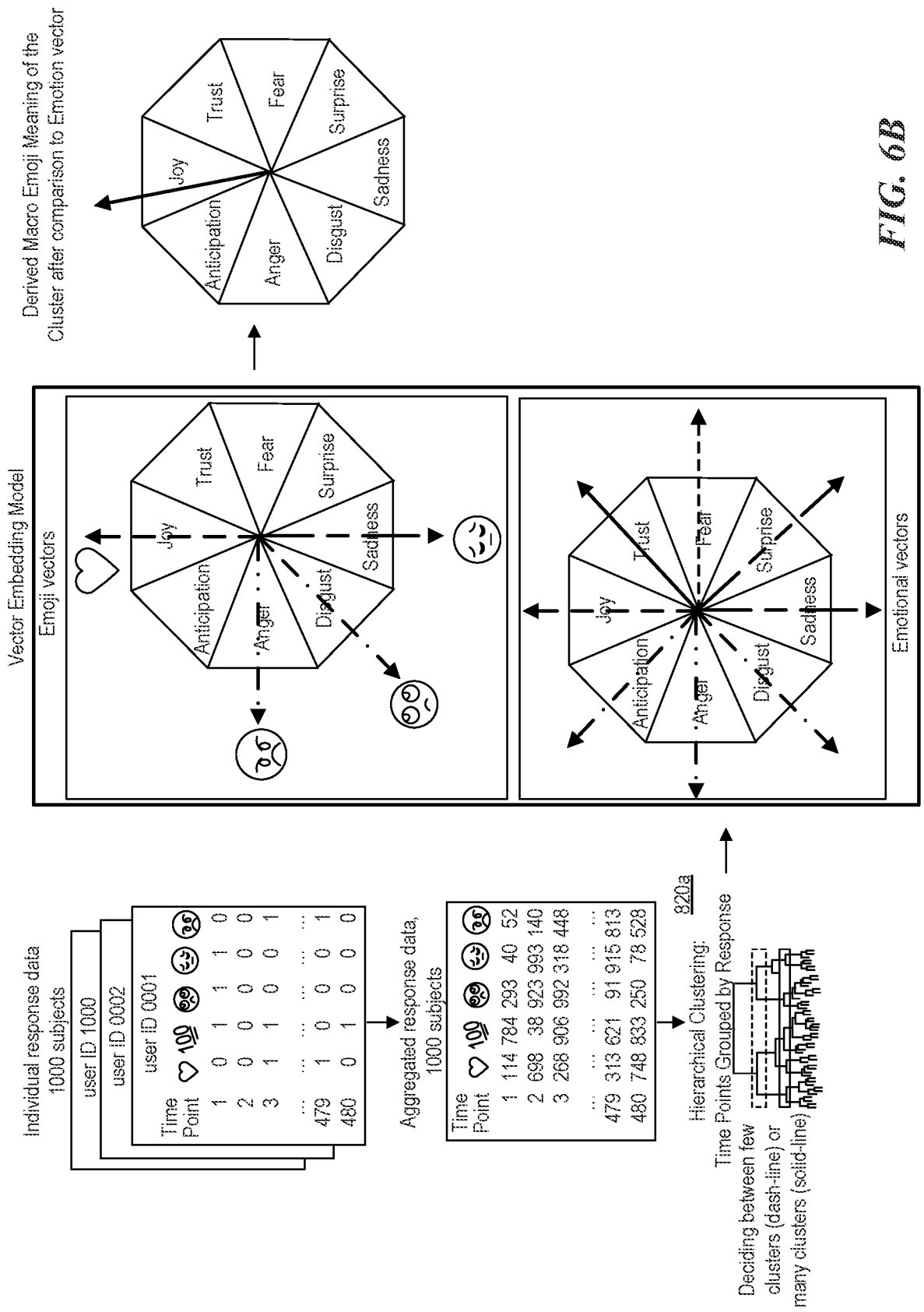

FIGS. 6A and 6B are flow diagrams illustrating example processes of analyzing response data to generate sentiment analysis data, according to various implementations. Process 600 receives response data (for example, individual response data from multiple users) at block 605. The response data can be captured using one or more of the following: user input devices (for example, keyboard, mouse, touchscreen, joystick, camera, haptic inputs, and so on) associated with computing systems (for example, desktops, laptops, mobile devices, and so on), user wearables that can help capture biometric data (for example, pulse, heart rate, blood pressure, sweat glands activity, pupil dilation, and so on), facial recognition tools, tools to capture user expressions, and so on. In some implementations, the response data is anonymized before it is used by process 600. For example, when the response data is captured using facial recognition tool, the system can first generate an anonymous animation of the respondent's facial expression so that not to actually identify the respondent.

Process 600 then validates the received response data at block 610. Process 600 can further identify constraints in the data. At block 615, process 600 aggregates the validated data. At block 620, process 600 identifies clusters. Utilizing clustering enables the discovery of unknown subgroups within the data including: group time-points that elicit similar emoji, group emoji by their use at various time-points and demographic and geographic differences in these groupings. Also differentiates by answers to the questions.

Multiple clustering methods may be used to identify statistically significant user engagement of emoji use: K-means, Gaussian Mixture Models, Hierarchal, DBSCAN, Means-shift and t-SNE. At block 625, process 600 can filter statistically significant clusters. Process 600 then proceeds to block 640 where it computes sentiment(s) of clusters.

Before process 600 can assign a cluster of emojis an emotional meaning it is preferable to build and train both the emotional model and the emoji model. See FIG. 1B—Semantic Training Model. The Semantic Training Model is made of 2 parts—Training the Emotional Model and Training the Emoji Model.

Building and Training the Emotional Model

In order to mathematically calculate the relationship between emoji and emotion over this multi-dimensional space, an initial operation converts to numerical values and/or a dimensional vector. Converting to numerical vectors allows the use of vector arithmetic to compare their relative values. These numerical vectors are also referred to herein as embeddings.

Emotion embedding can be performed by using the associated emotion-bearing words and making them into word vectors. Existing algorithms model words in the vector space in a way that semantically similar words appear closer to each other. In mathematical terms, the closer the cosine values are between vectors, the more semantically similar the meanings of the words.

The difference between the present approach and prior published models is that the present approach trains the emotion embedded vectors and emoji embedded vectors in the same way—both via word meaning to word vector association. Prior methods derived emoji meaning by their co-occurrence to words in feeds, such as in Twitter and SMS.

Figure 7A:
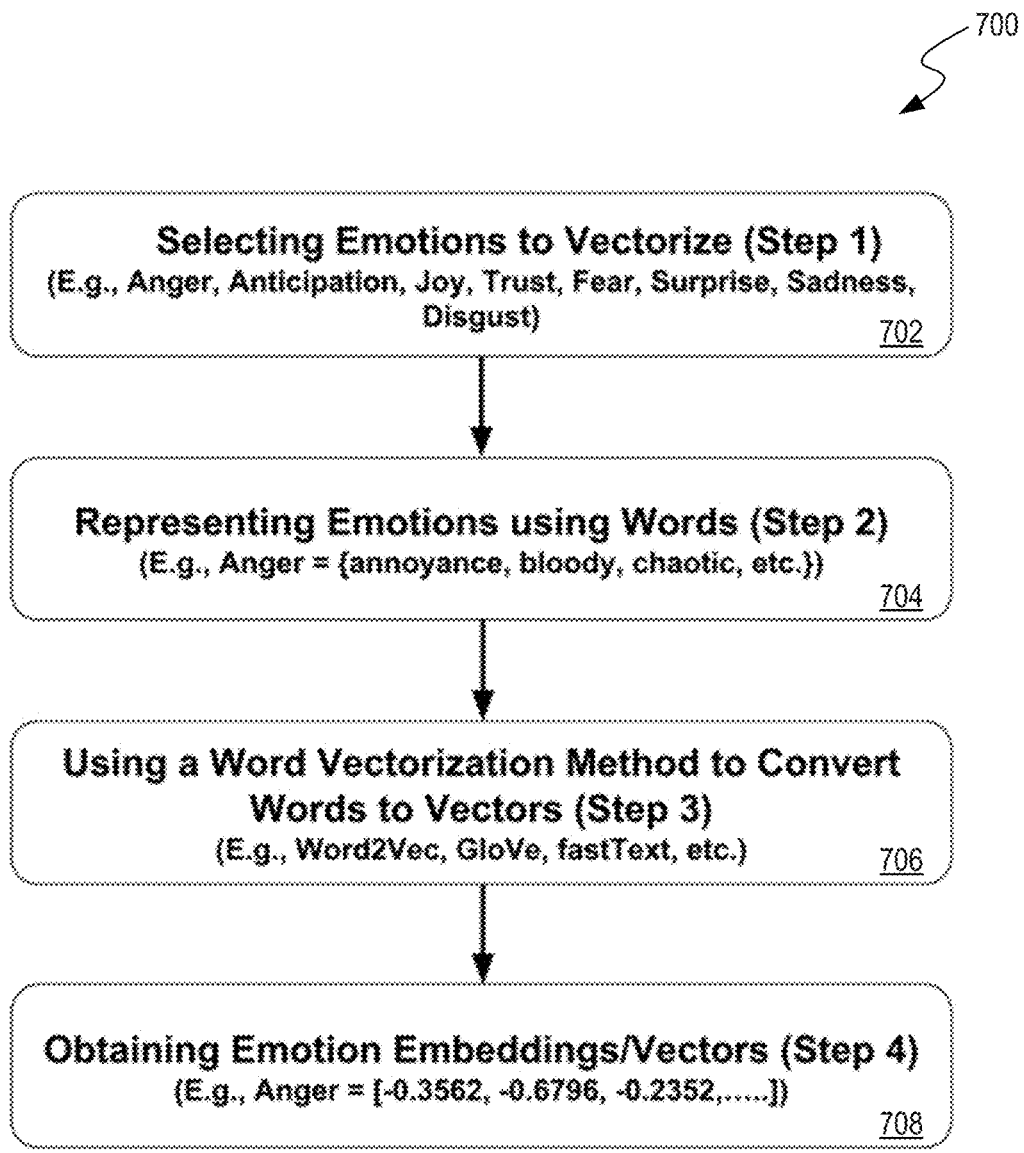
FIGS. 7A and 7B illustrates example methods of converting emotions and emojis into an emotion and emoji embeddings/vectors, respectively.

FIG. 7A illustrates example operations of a method 700 to convert an emotion into an emotion embedding/vector to represent the emotion in the vector space:

The method 700 includes an initial step 1 (702) that starts with a multi-dimensional emotional plane, e.g., the 8 emotions in Plutchik's wheel of emotions. In step 2 (704), emotion-bearing words may be extracted which describe each emotion from a lexicon. In step 3 (706), a word vector modeling approach may be employed to convert each emotion-bearing word into a vector in the multi-dimensional vector space.

In step 4 (708), the word vectors of the emotion-bearing words are preferably summed to form a single vector which is the emotion embedding. The result is emotional vectors (emotion embeddings) that represent emotions in the vector space.

Building and Training the Emoji Model

Figure 7B:
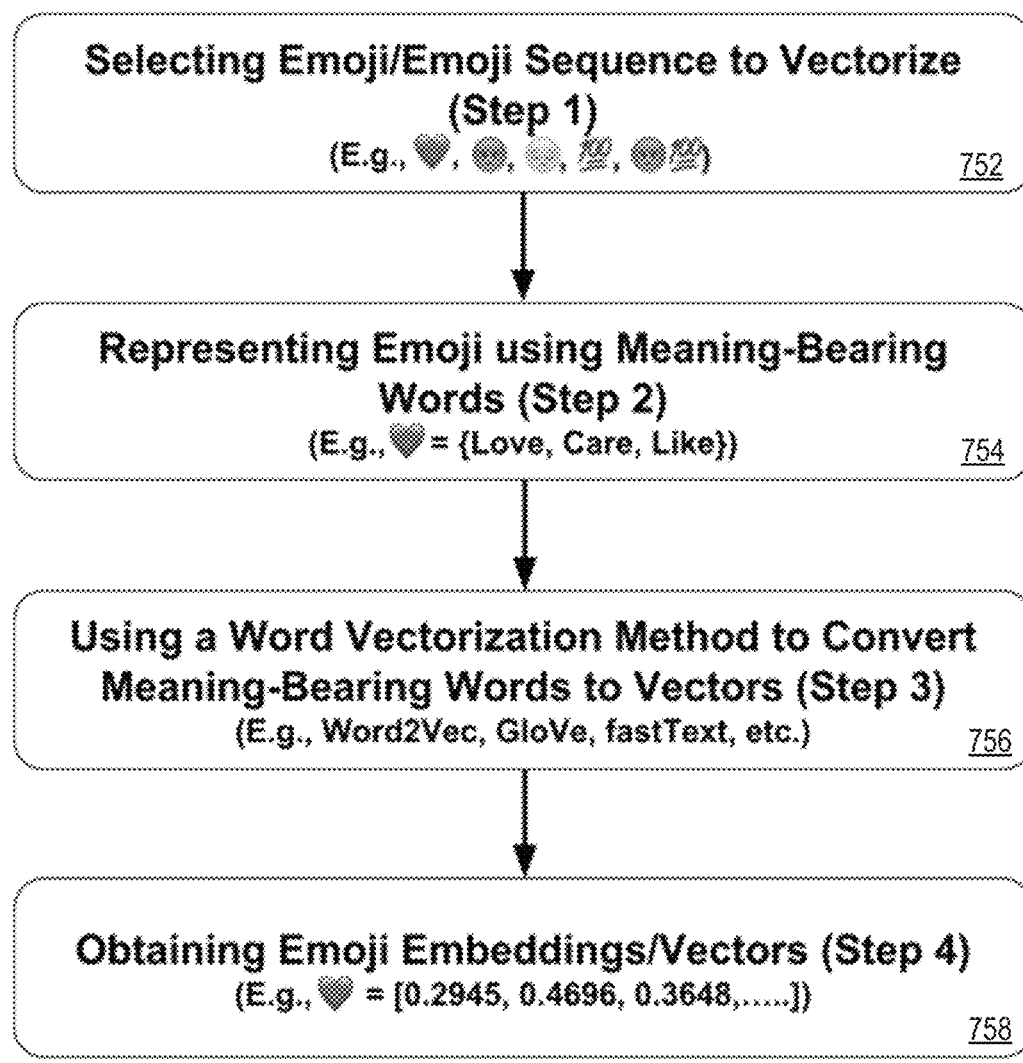

FIG. 7B illustrates an example method 750 of modeling (or vectorizing) emojis. In step 1 (752), a selected set of emojis and/or emoji sequences of interest are identified for modeling. In step 2 (754), a series of word meanings may be assigned to each emoji using emoji dictionary definitions, (e.g., EmojiNet). For example, for the Red Heart emoji, meaning-bearing words such as love, like and care, among others, can be used to represent its meaning. In step 3 (756), the output from the same word vector modeling approaches may then be used to convert each meaning-bearing word that describes emoji meaning into vector space. In step 4 (758), and through aggregation, one vector is obtained for each emoji. These vectors may be referred to as emoji embeddings.

Word vectors are learned from a large corpus of text data using the Word-to-vec algorithm. Word vectors are obtained for each word in the text corpus, and each emoji meaning word is replaced using its corresponding word vector. For example, the words are used to model the Red Heart emoji such as love, care, and like are replaced by their corresponding word vectors. Then, all word vectors belonging to each emoji are combined using vector summation methods, which gives the final emoji embedding for a given emoji. The emoji embedding vector of the Red Heart emoji, which is ♡ =[0.2945, 0.4696, 0.3648, ... ] uniquely identifies the projection of the Red Heart emoji in the vector space.

Figure 7C:
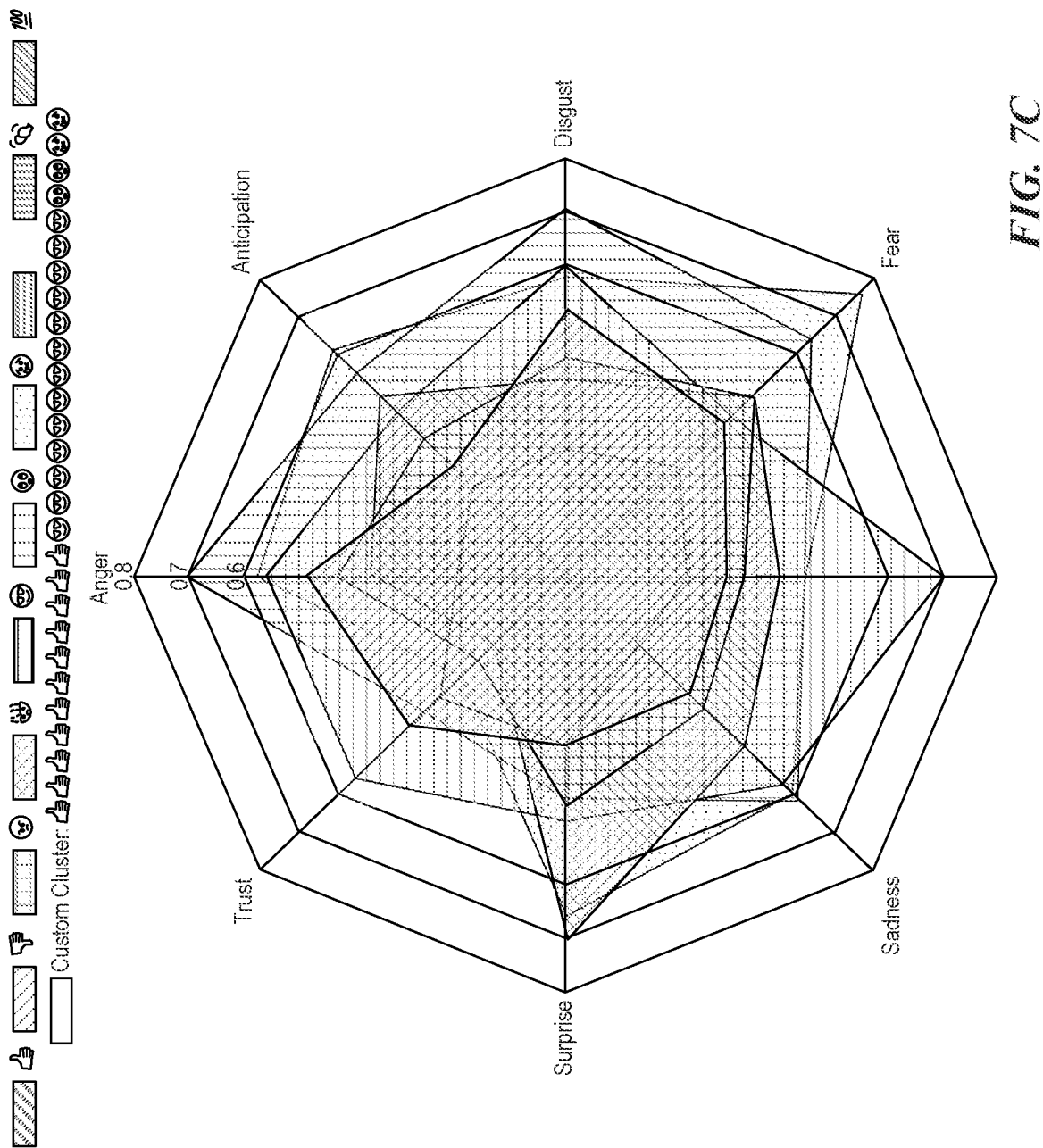
FIG. 7C illustrates an example of the word-to-vector algorithm.

FIG. 7C shows an example of using the word-to-vector algorithm. As shown therein, each emoji can be represented as a polygon in the vector space, and a custom emoji cluster can be represented as an aggregation of the individual polygons of the emojis in that custom emoji cluster. FIG. 7C illustrates an example of "meandering," in which the resulting emoji vector includes a lot of noise.

Once emotions and emoji meanings are modeled as vectors (or embeddings), one can project any emoji's emotional valence towards any emotion by taking the cosine similarity of that emoji's meaning vector and an emotion's vector.

Emoji Combinations in a Cluster

To calculate the emotional valence of an emoji sequence, the emoji vectors of all the emojis in the sequence are combined and projected toward each emotion using cosine similarity. Referring again to block 640, process 600 computes sentiment(s) of the filtered clusters. For instance, process 600 determines combinations of emoji meaning, sequence ("bursts") of emoji meaning, and so on. Once a cluster of emoji from our statistical analysis modeling has been identified, process 600 can map these clusters of emojis to their associated emotions by matching the emoji embeddings to emotional embeddings with the closest cosine value.

This semantic model is deployed, for example, when a cluster of combinations of emojis have been identified from a video to determine that associated emotion of that cluster. The emoji combinations in a cluster may be converted into an emoji embedded vector in a N dimensional vector space and compared to the emotional embedded vector from the model, thereby determining sentiment. This allows for the measurement of a user's emotion in a multidimensional setting, without being restricted to a binary representation of emotion.

While certainly viable, some challenges have been identified with the above modeling approach which have led to ways to enhance it. These are described below.

1. Multiple Meanings and Uses of Words in Language

It has been determined that word-to-vec word vectorization method that used a google or other word corpus should not be limited to the emotion-only meaning of words. Therefore, words such as "like", used in the ♡ emoji in the example above, delivered words based on other uses of "like" in language.

For instance, in the example below, the first is the desired meaning, while the others resulted in incorrect word vectorization.

| Desired meaning | Incorrect vectorization |
| --- | --- |
| Like = enjoy | To be + like = describe personality/characteristics |
| I like coffee | What is he like? |
| | Like = the same as |
| | This Coke tastes like Pepsi |
| | Would like = want |
| | I'd like a hamburger please |
| | Look like = appearance |
| | What does he look like? |

There is no simple method to curate these unwanted meanings out of the word-to-vec process. The algorithm can be limited in its ability to restrict its choice of associated words to only emotion or sentiment and automatically picks up all meaning-bearing words in the English language regardless of intended use or meaning. Overcoming this may require the creation of a corpus composed of only sentiment/emotional words by supervised machine learning. Such AI would remove all word associations that are not emotional/sentiment related. It is currently challenging to identify a commercially available corpus composed of only emotion/sentiment word meanings and associations.

It is believed that addressing the challenge of multiple meanings in language would require either the creation of a restricted corpus by supervised learning on an existing corpus, or a change the vectorization method. Current efforts focus on the latter wherein the word-to-vec is replaced by a curated vector to capture the mapping of emoji to emotion using the position of the emotion on the wheel.

2. "Meandering"

A second challenge is that the meaning-bearing words and the word association techniques in the vectorization tend to dilute the initial emotional valency. For example, ☺ (Anger), is associated with annoyance, displeasure, exasperation, impatience along with stronger words like acrimony, antagonism, hatred. This can create "noise" in the signal that makes the embedded vector "meander" across the emotional vector space. Emoji like 👏 have uses that are opposite in valency (approval is positive and sarcastic clapping is negative) which exacerbate the "meandering". Moreover, when multiple emoji in emoji combinations are analyzed this "meandering" can be further exaggerated, resulting in a potentially unclear signal.

It is believed that "Meandering" could be addressed either by upfront curation (preferred) or back-end delimiting by choosing the closest emotion. Expanding the emotional wheel also proved fruitful.

3. Insufficient Emotions

A third challenge is that the 8-dimensional emotions of Plutchik does not embody more nuanced emotions. For example, the emotion of Joy is more actionable when expressed as either approval, love, aesthetic appreciation, amusement, awe, craving, entrancement, excitement, interest, joy, nostalgia, relief, satisfaction. While these are all flavors of a positive feeling, they are different enough to explain and predict different outcomes in behavior.

To address this, and to support the option of upfront curation, an expanded emotional "wheel" became necessary to provide more variety and optionality of emotions to compile a richer vector. In the mapping of emoji to emotion, the emoji vector was defined to contain the order of the vector that corresponds to the position of the emotion in the wheel. More than 8 positions are deemed necessary to define an emoji vector, hence the expansion.

With the above considerations in mind, the multi-dimensional emotional space has been extended to a dynamic wheel of customizable emotions (e.g., 36 in the current implementation) reflecting emoji development, emotional nuances elicited by certain videos, changes in emoji meaning through truth setting, emoji use in combinations, and the like.

Figure 8:
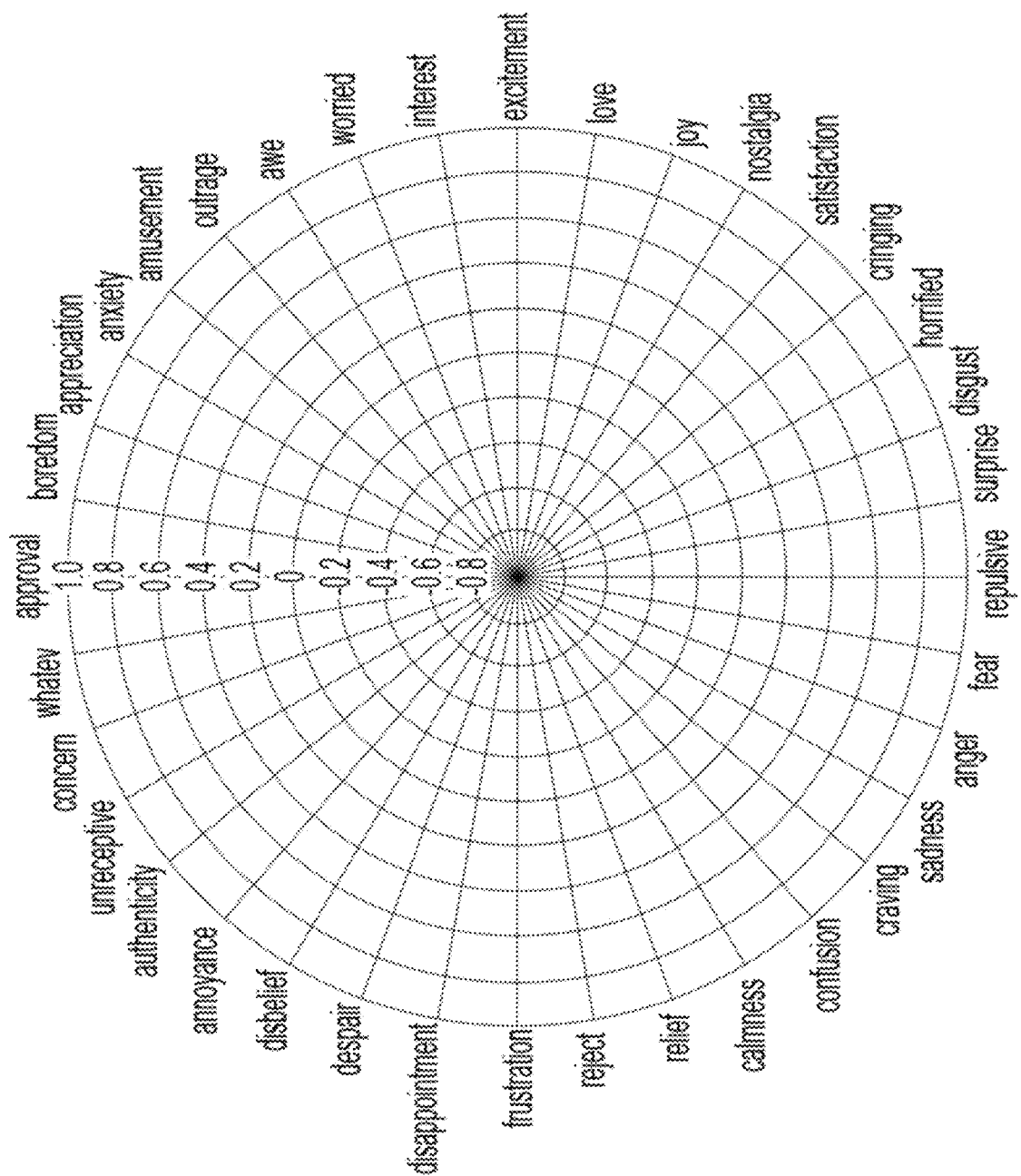
FIG. 8 illustrates an example of a modified semantic wheel.

In some embodiments, the current set of 36 emotions are: approval, boredom, appreciation, anxiety, amusement, outrage, awe, worried, interest, excitement, love, joy, nostalgia, satisfaction, cringing, horrified, disgust, surprise, repulsive, fear, anger, sadness, craving, confusion, calmness, relief, reject, frustration, disappointment, despair, disbelief, annoyance, authenticity, unreceptive, concern, whatev. FIG. 8 is an example of a modified semantic wheel that incorporates each of the 36 emotions on its circumference with the radius representing the magnitude of a particular emotion.

Figure 9:
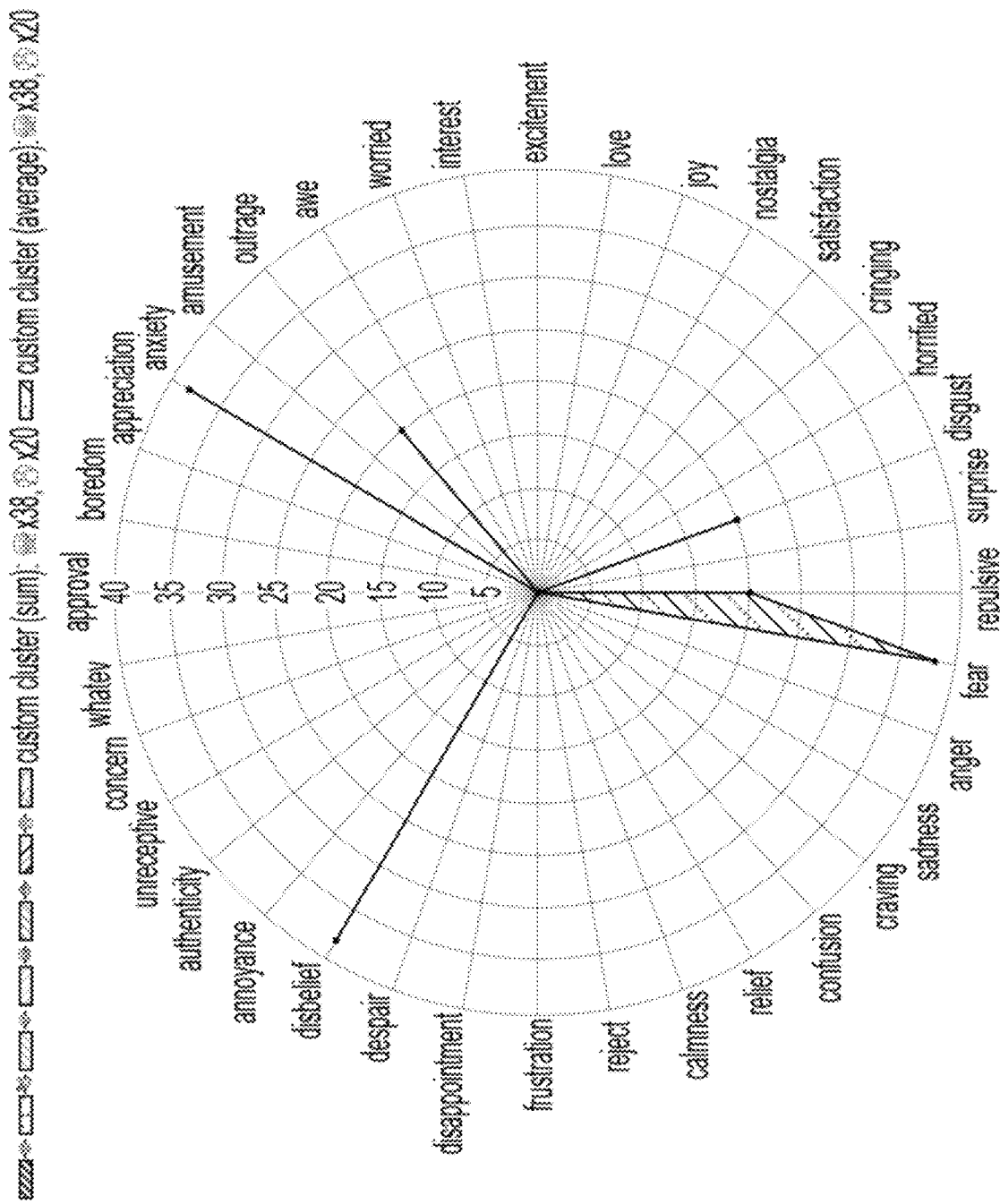
FIG. 9 illustrates an example of an emoji cluster using the modified semantic wheel illustrated in FIG. 8.

An example of an emoji on the modified semantic wheel shown in FIG. 8 is illustrated in FIG. 9. As shown therein, the emoji is represented by anxiety (0.38), outrage (0.20), disgust (0.20), repulsive (0.20), fear (0.38) and disbelief (0.38).

Calculating the Emotional Valence of an Emoji

To calculate the emotional valence of an emoji, each emoji is mapped to 3 primary emotions. For example, 😍 means love, appreciation and craving. The vector for heart eyes, given the current set of 36 emotions described above (and illustrated on the semantic wheel in FIG. 8), is:

😍 =[0, 0, 1, 0, 0, 0, 0, 0, 0, 0, 1, 0, 0, 0, 0, 0, 0, 0, 0, 0, 0, 0, 1, 0, 0, 0, 0, 0, 0, 0, 0, 0, 0, 0, 0, 0]

The present implementation maps all 17 emoji currently in use to the 36 emotions in the semantic "wheel" (as illustrated in FIGS. 8 and 9). Each emotion retains its position and is currently binary (1 or 0). In other embodiments, this can be refined to use fractions as more is learned and machine learning or AI algorithms are deployed.

Emoji Combinations in a Cluster

Once a cluster of responses has been identified statistically, the cluster count is fed into the model. The model gives each emoji in the cluster an equal weighting to the 3 emotions. When some emoji are mapped to the same emotion, that emotion will be represented accordingly.

During truth setting, each emoji vector (the emoji to emotion mapping) will be refined and the model updated to include the learnings. In some embodiments, truth sets can be generated or retrieved (e.g., using process 600 in FIG. 6A). In an example, truth sets can be obtained by cross referencing findings to a real group of users (focus groups or panels) to validate that the model correctly translated an emoji to its intended emotion.

Future Proofing and Machine Learning (ML)/Artificial Intelligence (AI)

It is anticipated that the initial curated emoji vectors will be refined as more is learned. By capturing demographics (e.g., age range, gender, location) and confirming through truth setting the intended meaning of emoji as they vary across demographic, the model can learn and refine, via machine learning, the mapping of emoji meaning to emotion. For example, the end result could deploy a different emoji vector by demographic stratification for each emoji in a cluster.

It is also contemplated that future implementations could incorporate voice activation by using existing voice recognition software to augment user reactions. For example, users can react by voice (either separately or in addition to pressing an emoji) to a video or an audio story such as a podcast. The popularity of podcasts, and the price point to produce audio only, makes for a compelling business case. Initial analysis suggests the word-to-vec process could be enhance by adapting it to support voice. The expanded wheel as it currently exists would be suitable for purpose.

Modeling Emoji Sequences ("Bursts")

In some embodiments, the frameworks described above can be used to model a combination of emojis. FIG. 10A illustrates an example of the emoji vector model. As illustrated therein, the Anger, Frustration, Sadness, Surprise, 💯, Care, Love and Like emojis are singular (or base) vectors. The {Frustration, Surprise} vector is the vector sum of the base Frustration and Surprise emoji vectors, and similarly, the {Love, Care, Like} vector is the vector sum of the base Love, Care and Like emoji vectors.

Either of the above frameworks can also be used to model the emotions of emoji sequences or "bursts." An emoji sequence can be represented as two or more emoji that appear together and expressed by the same person. When emoji sequences are present, the composite emoji vector (or embedding) of the emoji sequence can be calculated by taking the vector summation of the individual emoji vectors of each emoji that appears in the sequence.

Figure 10B:
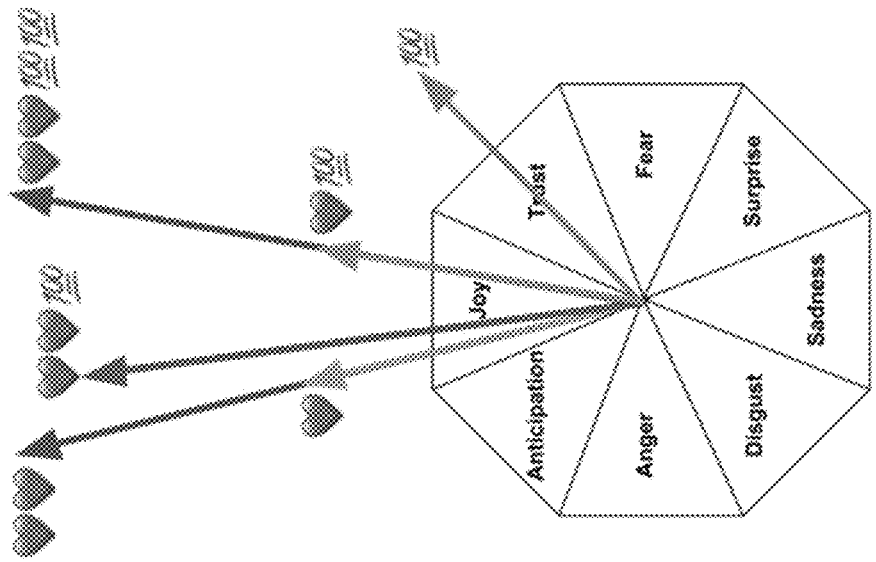
FIGS. 10A and 10B are diagrams illustrating examples of an emotional vector space model.
Figure 10A:
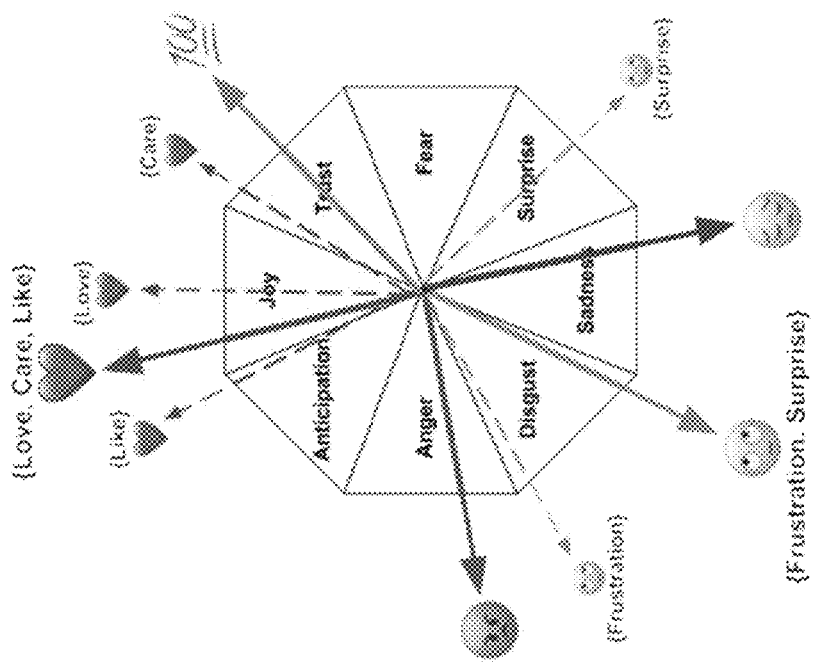

For example, and as illustrated in FIG. 10B, assume it is desirable to find the emotional valence of the emoji sequence Red Heart and Hundred Percent, i.e., ♥ 💯. To do this, an initial calculation can be made of the emoji vectors of ♥ and 💯, separately, and then a calculation of the composite emoji embedding of ♥ 💯 by using a vector summation method (e.g., vector average, vector sum, etc.). Once the composite emoji embedding ♥ 💯 is calculated, a measurement may be made of the emotional valence of the emoji sequence ♥ 💯 by taking the cosine similarity of the composite emoji vector with an emotion's vector as discussed earlier. FIG. 10B shows the projection of the emoji sequence ♥ 💯 in the emotional vector space.

FIG. 10B also shows how composite emoji vectors may be projected when the same emoji is repeated in an emoji sequence. Take, for example, the emoji sequence ♥ ♥. According to the composite emoji embedding calculation discussed above, the composite emoji vector of ♥ ♥ will be equal to the vector summation of the individual emoji vectors of ♥ and ♥. This is equal to two times the vector values available in the emoji vector of ♥. Thus, the projection of the composite emoji vector of ♥ ♥ in the vector space overlaps with the projection of the emoji vector of ♥. However, ♥ ♥'s emoji vector is two times the emoji vector of ♥. This is emphasized in the above Figure by giving a longer length to the composite emoji vector of ♥ ♥ compared to the length of the emoji vector of ♥. The calculation of the cosine similarity of the composite emoji vector of ♥ ♥ and emotion vectors of each emotion gives the emotional valence of the emoji sequence ♥ ♥. The composite emoji vector of ♥ ♥ 💯 is also shown in the above Figure. There, the composite emoji vector of ♥ ♥ 💯 is calculated by taking the vector summation of the individual emoji vectors of ♥, ♥, and 💯. Therefore, the composite emoji vector of ♥ ♥ 💯 is closer to the composite emoji vector of ♥ ♥. The new composite emoji vector may then be combined with the other emoji vectors in the cluster to determine sentiment of the cluster.

Modeling Multiple Possible Macro Emoji Meanings

In some embodiments, by changing the emoji meaning-bearing words, one is able to model multiple potential meanings of the Macro Emoji and thereby derive alternative emotional interpretations. This is important to account for alternative emoji meanings and to inform how they affect sentiment of the cluster. Emoji meanings are varied among Emoji dictionaries like EmojiNet, cultures, demographics and mobile device platforms, e.g., iOS and Android. Being able to model multiple and alternative emoji meanings provides valuable nuance to sentiment analysis.

Demographics and Device Variations

Past research has shown that emoji interpretation can be varied due to many factors including gender, age, geolocation, mobile platform, etc. The present Emotional Intelligence Model can also be modified to support emoji interpretation differences due to (i) gender, (ii) age, (iii) geolocation, and (iv) platform (i.e., iOS, Android, Windows, etc.).

Gender. To account for the emoji interpretation differences due to the differences in gender, one can learn gender-specific word embedding models using text written by different genders as training data. Then, the gender-specific word embedding models can be used to convert the emoji into their corresponding vector representations. If the gender of the person who generated a particular emoji is known, then the matching gender-based word embedding model can be used to convert the meaning-bearing words of the emoji into a vector representation (e.g., as depicted in FIG. 7B).

Geography: Similarly, to account for the emoji interpretation differences due to geolocation, a geolocation-specific text corpus can be employed to learn location-specific word embeddings that can be used to convert the meaning-bearing words of an emoji into a vector.

Figure 11:
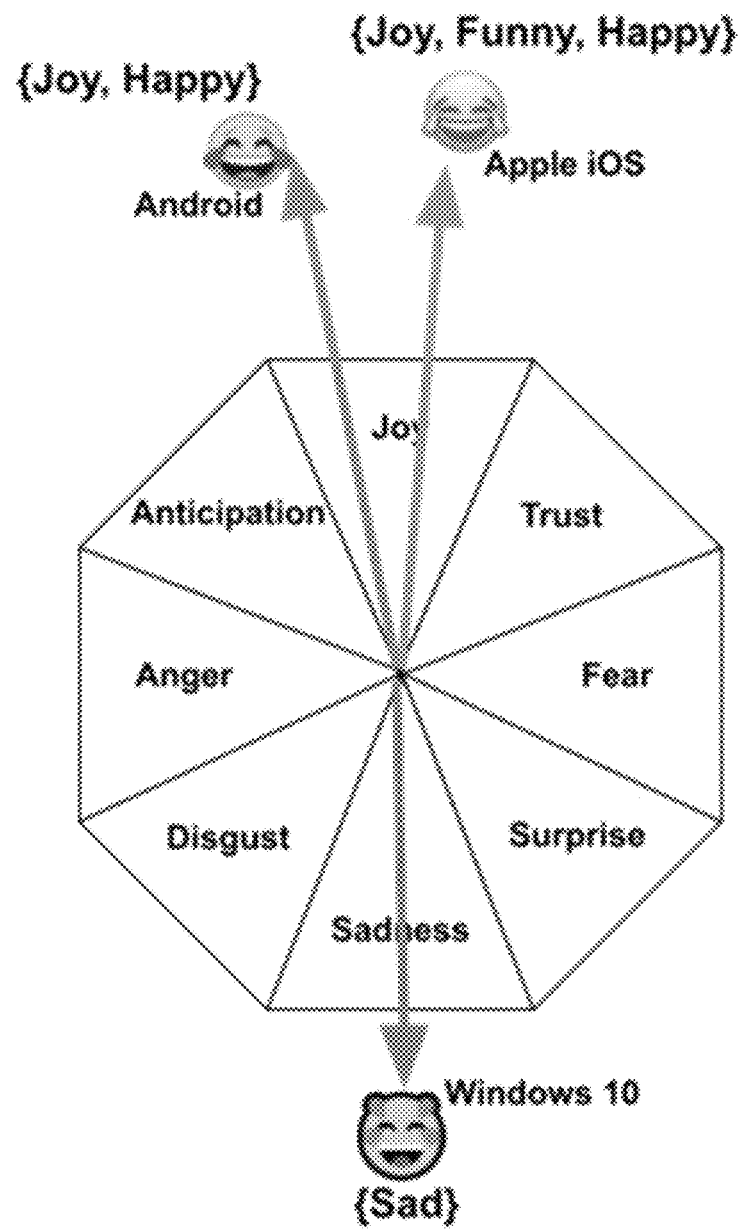
FIG. 11 is a diagram illustrating an example of an emotional vector space model for platform-specific emojis.

Platform/device: To account for the emoji interpretation differences due to platform-specific emoji depictions, platform-specific emoji meanings may be used as meaning-bearing words when training emoji vectors. FIG. 11 depicts the modeling of the emotional valence of platform-specific emoji by using the face with tears of joy emoji as an example. First, for all platform-specific emoji representations (platform-specific images of the face with tears of joy emoji in our example), it is preferred to select their platform-specific meaning-bearing words from an emoji meaning dictionary (such as EmojiNet). These platform-specific meaning-bearing words can then be used to model each platform-specific emoji representation's emoji vector (and Windows 10's emoji vector). For example, assume EmojiNet provides joy, funny, and happy as platform-specific meaning-bearing words for the Apple iOS-specific face with tears of joy emoji. Also, assume that EmojiNet provides sad as the platform-specific meaning-bearing word for the face with tears of joy emoji available in the Windows 10 platform. Further, assume that EmojiNet provides joy and happy as platform-specific meaning-bearing words for the face with tears of joy emoji available in the Android mobile platform. According to the emoji vector learning process discussed earlier, the platform-specific meaning-bearing words of each emoji can be used to learn emoji vectors for each platform. Then, those emoji vectors may be used to project the emotional valence of each platform-specific emoji.

For example, and as illustrated in FIG. 11, the face with tears of joy emoji available in the Apple iOS platform is only associated with positive meaning-bearing words such as joy, happy, and funny. Thus, when projecting it to the emotional vector space, it projects closer to the Joy emotion. The face with tears of joy emoji available in Windows 10 platform is only associated with "sad" in our example, which is a negative meaning-bearing word. The reason for associating "sad" emotion with the Windows 10 representation of the face with tears of joy emoji could be due to how the emoji is displayed with two teardrops squirting through each eye. Further, the red colored tongue shown in the opened mouth could also give the feeling that the emoji represents someone crying out loud, even though the emoji was intended to display a person laughing. The Android version of the face with tears of joy emoji is associated with joy and happy, both positive meaning-bearing words. Thus, the projection of its emoji vector is also close to joy emotion.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Figure 12:
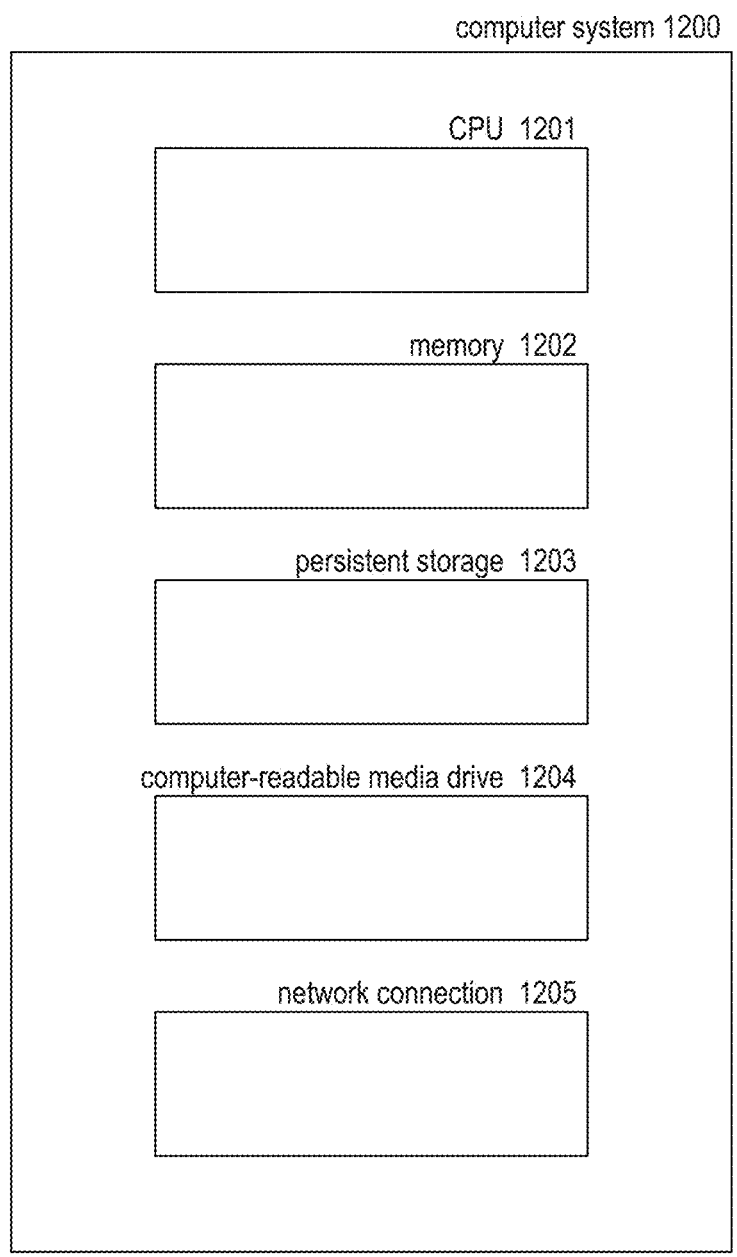
FIG. 12 is a block diagram showing some of the components typically incorporated in at least some of the computer systems and other devices on which the sentiment analysis system operates.

Several implementations are discussed below in more detail, in reference to the figures. Turning now to the figures, FIG. 12 is a block diagram showing some of the components typically incorporated in at least some of the computer systems and other devices on which the lazy updating system operates. In various embodiments, these computer systems and other devices 1200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 1201 for executing computer programs; a computer memory 1202 for storing programs and data while they are being used, including the lazy updating system and associated data, an operating system including a kernel, and device drivers; a persistent storage device 1203, such as a hard drive or flash drive for persistently storing programs and data; a computer-readable media drive 1204 that are tangible storage means that do not include a transitory, propagating signal, such as a floppy, CD-ROM, or DVD drive, for reading programs and data stored on a computer-readable medium; and a network connection 1205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the lazy updating system can be implemented using devices of various types and configurations, and having various components.

Figure 13:
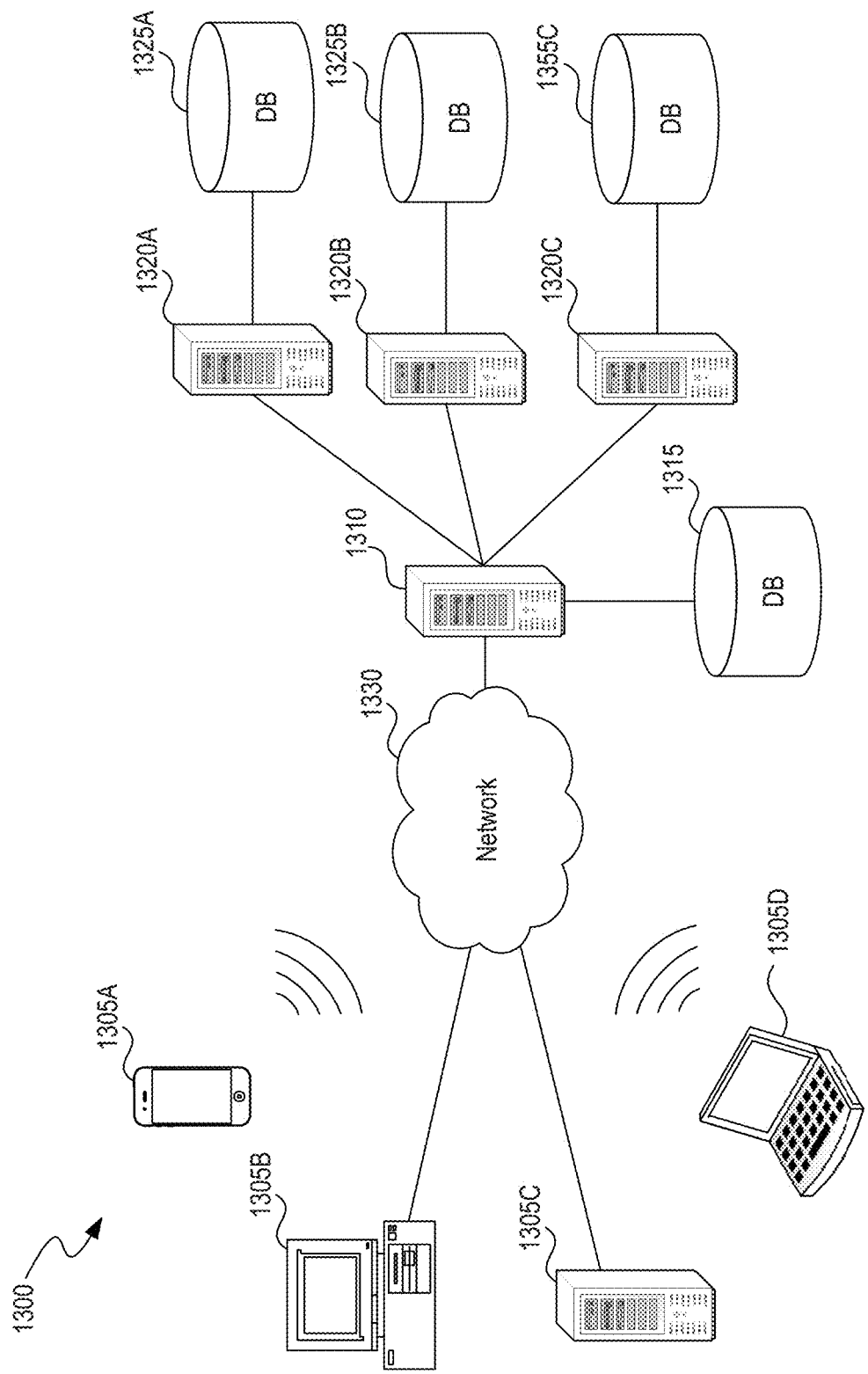
FIG. 13 is a system diagram illustrating an example of a computing environment in which the sentiment analysis system operates in some embodiments.

FIG. 13 is a system diagram illustrating an example of a computing environment in which the lazy updating system operates in some embodiments. In some implementations, environment 1300 includes one or more client computing devices 1305A-D, examples of which can include computer system 1200. Client computing devices 1305 operate in a networked environment using logical connections 1310 through network 1330 to one or more remote computers, such as a server computing device.

In some implementations, server 1310 is an edge server which receives client requests and coordinates fulfillment of those requests through other servers, such as servers 1320A-C. In some implementations, server computing devices 1310 and 1320 comprise computing systems, such as computer system 1200. Though each server computing device 1310 and 1320 is displayed logically as a single server, server computing devices can each be a distributed computing environment encompassing multiple computing devices located at the same or at geographically disparate physical locations. In some implementations, each server 1320 corresponds to a group of servers.

Client computing devices 1305 and server computing devices 1310 and 1320 can each act as a server or client to other server/client devices. In some implementations, servers (1310, 1320A-C) connect to a corresponding database (1315, 1325A-C). As discussed above, each server 1320 can correspond to a group of servers, and each of these servers can share a database or can have its own database. Databases 1315 and 1325 warehouse (e.g., store) information such as user data (e.g., user identifiers, user profiles, etc.), video data, emoji data, emotion data, demographic data, and so on. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. In some implementations, network 1330 is the Internet or some other public or private network. Client computing devices 1305 are connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 14:
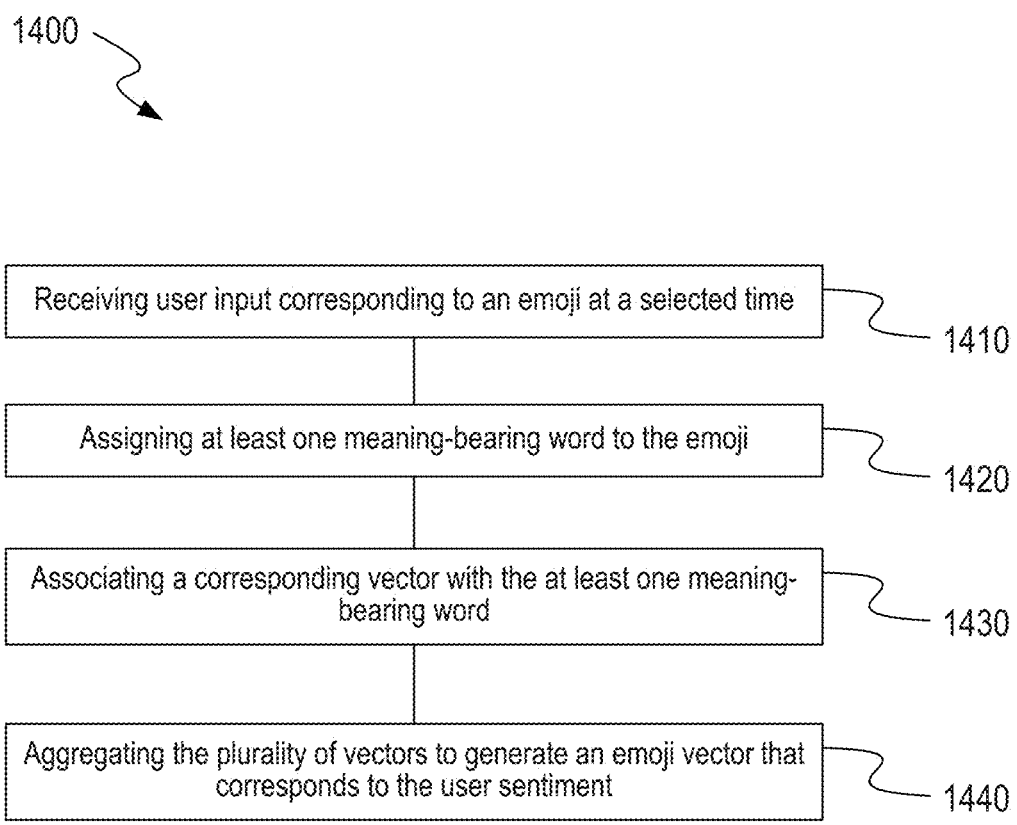
FIG. 14 is a flowchart for an example method for assessing user sentiment in response to an input stream.

FIG. 14 is a flowchart for an example method 1400 for assessing user sentiment in response to an input stream. The method 1400 includes, at operation 1410, receiving user input corresponding to an emoji at a selected time. In some embodiments, the input stream can be an audio stream, a video stream, an audiovisual stream or any sensory stream (e.g., a stream that includes smell).

The method 1400 includes, at operation 1420, assigning at least one meaning-bearing word to the emoji, wherein the at least one meaning-bearing word has an intended use or meaning that is represented by the emoji.

The method 1400 includes, at operation 1430, associating a corresponding vector with the at least one meaning-bearing word, wherein the corresponding vector is a vector of a plurality of vectors in a vector space.

The method 1400 includes, at operation 1440, aggregating the plurality of vectors to generate an emoji vector that corresponds to the user sentiment.

In some embodiments, the at least one meaning-bearing word is based on at least demographic information associated with the user.

In some embodiments, the demographic information comprises at least one of an age, a gender, and a location of the user.

In some embodiments, the method 1400 further comprises the operations of applying a word-to-vector algorithm to a corpus of text data, and generating, based on the applying, the at least one meaning-bearing word.

In some embodiments, generating the at least one meaning-bearing word is based on a location of the user.

In some embodiments, the corpus of text data comprises a geolocation-specific text corpus that is based on the location of the user.

In some embodiments, the assigning is based on an emoji dictionary.

In some embodiments, the at least one meaning-bearing word is selected from the group consisting of approval, outrage, repulsive, reject, frustrate, disappointment, despair, disbelief, annoyance, authenticity, unreceptive, and concern.

Figure 15:
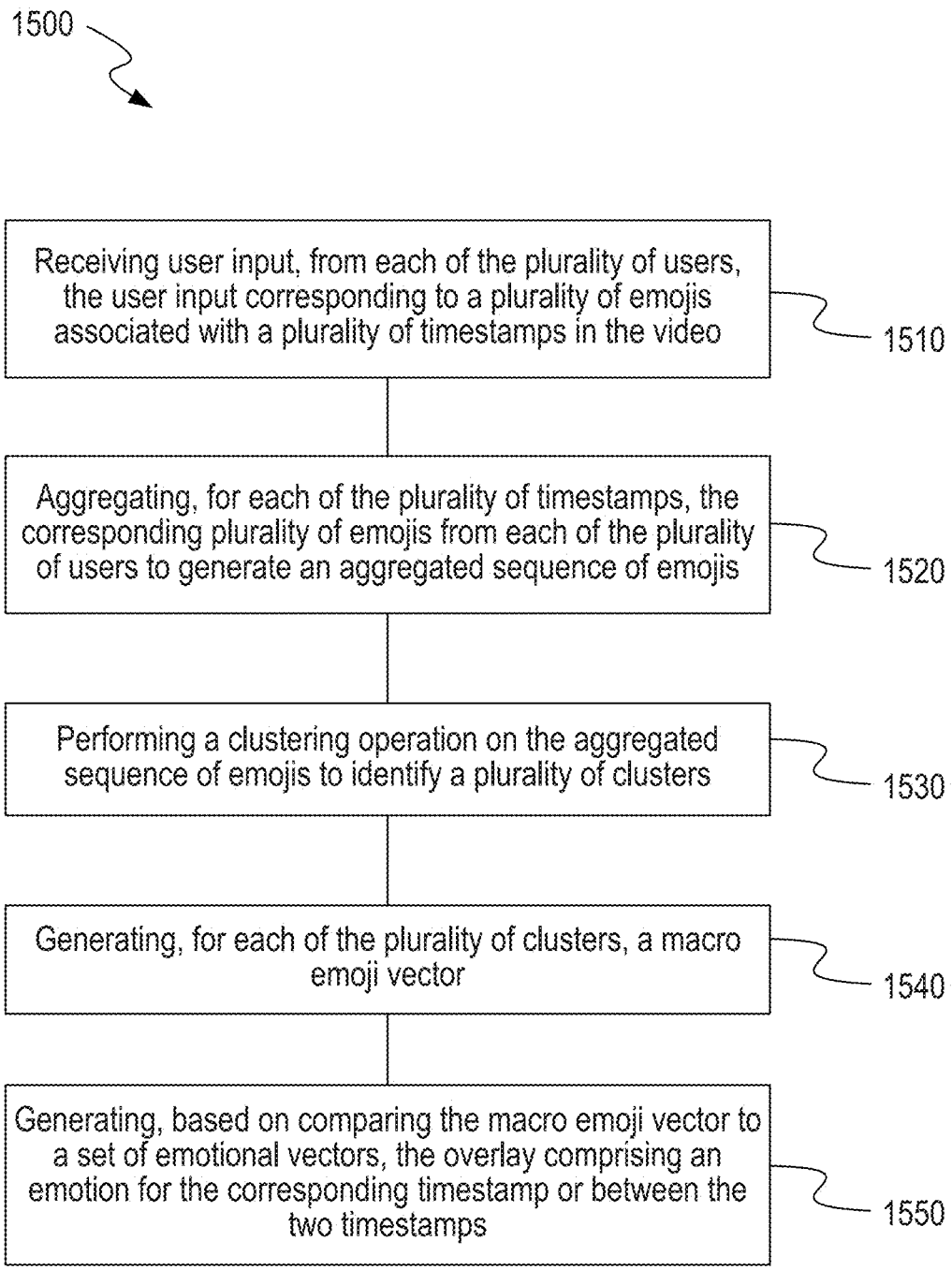
FIG. 15 is a flowchart for an example method for creating an overlay for a video in response to a plurality of users viewing the video.

FIG. 15 is a flowchart for an example method 1500 for creating an overlay for a video in response to a plurality of users viewing the video. The method 1500 includes, at operation 1510, receiving user input, from each of the plurality of users, the user input corresponding to a plurality of emojis associated with a plurality of timestamps in the video.

The method 1500 includes, at operation 1520, aggregating, for each of the plurality of timestamps, the corresponding plurality of emojis from each of the plurality of users to generate an aggregated sequence of emojis.

The method 1500 includes, at operation 1530, performing a clustering operation on the aggregated sequence of emojis to identify a plurality of clusters, wherein each cluster represents an aggregated user sentiment for the corresponding timestamp or between two timestamps of the plurality of timestamps.

The method 1500 includes, at operation 1540, generating, for each of the plurality of clusters, a macro emoji vector.

The method 1500 includes, at operation 1550, generating, based on comparing the macro emoji vector to a set of emotional vectors, the overlay comprising an emotion for the corresponding timestamp or between the two timestamps.

In some embodiments, the method 1500 further comprises the operation of streaming the video to each of the plurality of users.

In some embodiments, generating the emotion in the overlay comprises selecting an emotional vector from the set of emotional vectors with a cosine value that is closest to that of the macro emoji vector.

In some embodiments, generating the macro emoji vector comprises deriving a set of emoji vectors from a semantic training model, aggregating, for each of the plurality of clusters, each of the set of emoji vectors within the corresponding cluster to generate a set of aggregated emoji vectors, and computing a vector sum of the set of aggregated emoji vectors to generate the macro emoji vector for the corresponding cluster.

In some embodiments, wherein the clustering operation comprises at least one of a k-means clustering algorithm, a Gaussian mixture model, a hierarchical clustering algorithm, a density-based clustering algorithm, a mean-shift clustering algorithm, or a t distributed stochastic neighbor embedding (SNE) algorithm.

In some embodiments, a plurality of emojis received from a first user are generated by a first computing system, and wherein a plurality of emojis received from a second user are generated by a second computing system that is of a different type than the first computing system.

In some embodiments, the first computing system and the second computing system is a Windows 10 operating system, an iOS operating system, or an Android operating system.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

What is claimed is:

1. A method for assessing user sentiment in response to an input stream, comprising:
   receiving an email address of a user;
   assigning an identifier that corresponds to demographic information associated with the user, wherein the identifier is selected from a plurality of identifiers, and wherein a number of the plurality of identifiers obscures an identity of any single user;
   disassociating, subsequent to authenticating the user, the email address from the identifier to impair the traceability of the email address to the user;
   receiving, from the user, an input corresponding to an emoji at a selected time;
   assigning at least one meaning-bearing word to the emoji, wherein the at least one meaning-bearing word has an intended use or meaning that is represented by the emoji;
   associating a corresponding vector with the at least one meaning-bearing word, wherein the corresponding vector is a vector of a plurality of vectors in a vector space; and
   aggregating the plurality of vectors to generate an emoji vector that corresponds to the user sentiment.

2. The method of claim 1, wherein the at least one meaning-bearing word is based on at least the demographic information associated with the user.

3. The method of claim 2, wherein the demographic information comprises at least one of an age, a gender, and a location of the user.

4. The method of claim 1, further comprising:
   applying a word-to-vector algorithm to a corpus of text data; and
   generating, based on the applying, the at least one meaning-bearing word.

5. The method of claim 4, wherein generating the at least one meaning-bearing word is based on a location of the user.

6. The method of claim 5, wherein the corpus of text data comprises a geolocation-specific text corpus that is based on the location of the user.

7. The method of claim 1, wherein the assigning the at least one meaning-bearing word to the emoji is based on an emoji dictionary.

8. The method of claim 1, wherein the at least one meaning-bearing word is selected from the group consisting of approval, outrage, repulsive, reject, frustrate, disappointment, despair, disbelief, annoyance, authenticity, unreceptive, and concern.

9. A method for creating an overlay for a video in response to a plurality of users viewing the video, comprising:
   receiving, from each of the plurality of users, an email address of a corresponding user;
   assigning, for each of the plurality of users, an identifier that corresponds to demographic information associated with the corresponding user, wherein the identifier is selected from a plurality of identifiers, and wherein a number of the plurality of identifiers obscures an identity of any single user;
   disassociating, subsequent to authenticating the corresponding user, the email address from the identifier to impair the traceability of the email address to the corresponding user;
   receiving, from each of the plurality of users, an input corresponding to a plurality of emojis associated with a plurality of timestamps in the video;
   aggregating, for each of the plurality of timestamps, the corresponding plurality of emojis from each of the plurality of users to generate an aggregated sequence of emojis;
   performing a clustering operation on the aggregated sequence of emojis to identify a plurality of clusters, wherein each cluster represents an aggregated user sentiment for the corresponding timestamp or between two timestamps of the plurality of timestamps;
   generating, for each of the plurality of clusters, a macro emoji vector; and
   generating, based on comparing the macro emoji vector to a set of emotional vectors, the overlay comprising an emotion for the corresponding timestamp or between the two timestamps.

10. The method of claim 9, further comprising:
    streaming the video to each of the plurality of users.

11. The method of claim 9, wherein generating the emotion in the overlay comprises:
    selecting an emotional vector from the set of emotional vectors with a cosine value that is closest to that of the macro emoji vector.

12. The method of claim 9, wherein generating the macro emoji vector comprises:
    deriving a set of emoji vectors from a semantic training model;

aggregating, for each of the plurality of clusters, each of the set of emoji vectors within the corresponding cluster to generate a set of aggregated emoji vectors; and computing a vector sum of the set of aggregated emoji vectors to generate the macro emoji vector for the corresponding cluster.

13. The method of claim 9, wherein the clustering operation comprises at least one of a k-means clustering algorithm, a Gaussian mixture model, a hierarchical clustering algorithm, a density-based clustering algorithm, a mean-shift clustering algorithm, or a t-distributed stochastic neighbor embedding (SNE) algorithm.

14. The method of claim 9, wherein a plurality of emojis received from a first user are generated by a first computing system, and wherein a plurality of emojis received from a second user are generated by a second computing system that is of a different type than the first computing system.

15. The method of claim 14, wherein the first computing system and the second computing system is a Windows 10 operating system, an iOS operating system, or an Android operating system.

16. An apparatus for assessing user sentiment in response to an input stream, comprising:
a processor; and
a memory coupled to the processor, wherein the processor is configured to:
receive an email address of a user;
assign an identifier that corresponds to demographic information associated with the user, wherein the identifier is selected from a plurality of identifiers, and wherein a number of the plurality of identifiers obscures an identity of any single user;
disassociate, subsequent to authenticating the user, the email address from the identifier to impair the traceability of the email address to the user;
receive, from the user, an input corresponding to an emoji at a selected time;
assign at least one meaning-bearing word to the emoji, wherein the at least one meaning-bearing word has an intended use or meaning that is represented by the emoji;
associate a corresponding vector with the at least one meaning-bearing word, wherein the corresponding vector is a vector of a plurality of vectors in a vector space; and
aggregate the plurality of vectors to generate an emoji vector that corresponds to the user sentiment.

17. The apparatus of claim 16, wherein the at least one meaning-bearing word is based on at least the demographic information associated with the user, and wherein the demographic information comprises at least one of an age, a gender, and a location of the user.

18. The apparatus of claim 16, wherein the processor is further configured to:
apply a word-to-vector algorithm to a corpus of text data; and
generate, based on applying, the at least one meaning-bearing word.

19. The apparatus of claim 18, wherein generating the at least one meaning-bearing word is based on a location of the user, and wherein the corpus of text data comprises a geolocation-specific text corpus that is based on the location of the user.

20. The apparatus of claim 16, wherein assigning the at least one meaning-bearing word to the emoji is based on an emoji dictionary.

21. The apparatus of claim 16, wherein the at least one meaning-bearing word is selected from the group consisting of approval, outrage, repulsive, reject, frustrate, disappointment, despair, disbelief, annoyance, authenticity, unreceptive, and concern.

22. An apparatus for creating an overlay for a video in response to a plurality of users viewing the video, comprising:
a processor; and
a memory coupled to the processor, wherein the processor is configured to:
receive, from each of the plurality of users, an email address of a corresponding user;
assign, for each of the plurality of users, an identifier that corresponds to demographic information associated with the corresponding user, wherein the identifier is selected from a plurality of identifiers, and wherein a number of the plurality of identifiers obscures an identity of any single user;
disassociate, subsequent to authenticating the corresponding user, the email address from the identifier to impair the traceability of the email address to the corresponding user;
receive, from each of the plurality of users, an input corresponding to a plurality of emojis associated with a plurality of timestamps in the video;
aggregate, for each of the plurality of timestamps, the corresponding plurality of emojis from each of the plurality of users to generate an aggregated sequence of emojis;
perform a clustering operation on the aggregated sequence of emojis to identify a plurality of clusters, wherein each cluster represents an aggregated user sentiment for the corresponding timestamp or between two timestamps of the plurality of timestamps;
generate, for each of the plurality of clusters, a macro emoji vector; and
generate, based on comparing the macro emoji vector to a set of emotional vectors, the overlay comprising an emotion for the corresponding timestamp or between the two timestamps.

23. The apparatus of claim 22, wherein the processor is further configured to:
stream the video to each of the plurality of users.

24. The apparatus of claim 22, wherein the processor is further configured, as part of generating the emotion in the overlay, to:
select an emotional vector from the set of emotional vectors with a cosine value that is closest to that of the macro emoji vector.

25. The apparatus of claim 22, wherein the processor is further configured, as part of generating the macro emoji vector, to:
derive a set of emoji vectors from a semantic training model;
aggregate, for each of the plurality of clusters, each of the set of emoji vectors within the corresponding cluster to generate a set of aggregated emoji vectors; and
compute a vector sum of the set of aggregated emoji vectors to generate the macro emoji vector for the corresponding cluster.

26. The apparatus of claim 22, wherein the clustering operation comprises at least one of a k-means clustering algorithm, a Gaussian mixture model, a hierarchical clustering algorithm, a density-based clustering algorithm, a mean-shift clustering algorithm, or a t-distributed stochastic neighbor embedding (SNE) algorithm.

27. The apparatus of claim 22, wherein a plurality of emojis received from a first user are generated by a first computing system, and wherein a plurality of emojis received from a second user are generated by a second computing system that is of a different type than the first computing system.

28. The apparatus of claim 27, wherein the first computing system and the second computing system is a Windows 10 operating system, an iOS operating system, or an Android operating system.

* * * * *